United States Patent
Takehara et al.

(10) Patent No.: US 9,800,890 B2
(45) Date of Patent: *Oct. 24, 2017

(54) MOVING PICTURE ENCODING DEVICE, MOVING PICTURE ENCODING METHOD AND MOVING PICTURE ENCODING PROGRAM AS WELL AS MOVING PICTURE DECODING DEVICE, MOVING PICTURE DECODING METHOD AND MOVING PICTURE DECODING PROGRAM

(71) Applicant: JVC KENWOOD Corporation, Yokohama-shi (JP)

(72) Inventors: Hideki Takehara, Yokosuka (JP); Motoharu Ueda, Yokosuka (JP); Masayoshi Nishitani, Yokosuka (JP); Hiroya Nakamura, Yokosuka (JP); Satoru Sakazume, Yokosuka (JP); Kazumi Arakage, Yokosuka (JP); Shigeru Fukushima, Yokosuka (JP); Toru Kumakura, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,449

(22) Filed: Mar. 9, 2017

(65) Prior Publication Data

US 2017/0188043 A1    Jun. 29, 2017

Related U.S. Application Data

(63) Continuation of application No. 15/332,142, filed on Oct. 24, 2016, which is a continuation of application
(Continued)

(30) Foreign Application Priority Data

Mar. 8, 2011  (JP) ................................ 2011-050118
Mar. 8, 2011  (JP) ................................ 2011-050119
(Continued)

(51) Int. Cl.
*H04N 19/52* (2014.01)
*H04N 19/44* (2014.01)
(Continued)

(52) U.S. Cl.
CPC ........... *H04N 19/52* (2014.11); *H04N 19/105* (2014.11); *H04N 19/176* (2014.11); *H04N 19/44* (2014.11); *H04N 19/46* (2014.11); *H04N 19/70* (2014.11)

(58) Field of Classification Search
CPC .... H04N 19/52; H04N 19/105; H04N 19/176; H04N 19/44; H04N 19/46; H04N 19/70
(Continued)

(56) References Cited

U.S. PATENT DOCUMENTS

| 5,608,458 A | 3/1997 | Chen et al. |
| 2007/0009050 A1 | 1/2007 | Wang et al. |

(Continued)

FOREIGN PATENT DOCUMENTS

| JP | 2011-259204 A | 12/2011 |
| WO | 2009/051419 A2 | 4/2009 |
| WO | 2011/155364 A1 | 12/2011 |

OTHER PUBLICATIONS

ISO/IEC 13818-2 Information Technology, "Generic Coding of Moving Pictures and Associated Audio," ITU-T Draft Rec. H.262 (Mar. 25, 1994).
(Continued)

*Primary Examiner* — Christopher S Kelley
*Assistant Examiner* — Matthew Kwan

(74) *Attorney, Agent, or Firm* — Venable LLP; Michael A. Sartori; Miguel A. Lopez

(57) ABSTRACT

A first vector predictor candidate list generating unit generates a first motion vector predictor candidate list from motion vectors of encoded neighboring blocks to blocks to be encoded. A second vector predictor candidate list generating unit generates a second motion vector predictor candidate list from motion vectors of blocks at the same positions as the blocks to be encoded in an encoded image and neighboring blocks to the blocks at the same positions. A combination determining unit determines whether to generate a third vector predictor candidate list combining the first and second vector predictor candidate lists by comparison of a block size of the blocks to be encoded and a threshold size. A vector predictor candidate list deciding unit generates the third vector predictor candidate list from the first vector predictor candidate list.

3 Claims, 34 Drawing Sheets

Related U.S. Application Data

No. 14/927,173, filed on Oct. 29, 2015, now Pat. No. 9,516,318, which is a continuation of application No. 14/020,644, filed on Sep. 6, 2013, now Pat. No. 9,204,147, which is a continuation of application No. PCT/JP2012/001503, filed on Mar. 5, 2012.

(30) Foreign Application Priority Data

| | | |
|---|---|---|
| May 26, 2011 | (JP) | 2011-118339 |
| May 26, 2011 | (JP) | 2011-118340 |
| Feb. 29, 2012 | (JP) | 2012-043272 |
| Feb. 29, 2012 | (JP) | 2012-043273 |

(51) Int. Cl.
*H04N 19/176* (2014.01)
*H04N 19/70* (2014.01)
*H04N 19/46* (2014.01)
*H04N 19/105* (2014.01)

(58) Field of Classification Search
USPC .................................................. 375/240.14
See application file for complete search history.

(56) References Cited

U.S. PATENT DOCUMENTS

| | | |
|---|---|---|
| 2008/0092005 A1 | 4/2008 | Huott et al. |
| 2009/0316044 A1* | 12/2009 | Chen ............... H04N 5/145 348/441 |
| 2009/0323813 A1 | 12/2009 | Maciel de Faria et al. |
| 2012/0189055 A1 | 7/2012 | Chien et al. |

OTHER PUBLICATIONS

ISO/IEC 14496-10 Information Technology, "Coding of Audio-Visual Objects," Part 10: Advanced Video Coding, ITU-T Rec. H.264 (Jun. 2011).
"Test Model Under Consideration," Joint Collaborative Team on Video Coding (JCT-VC) of ITU-T SG16 WP3 and ISO/IEC JTC1/SC29/WG11, JCTVC-B205, 2nd Meeting: Geneva, CH, 21-28, pp. 1-6, 26-27, 80-93 (Jul. 2010).
Joel Jung et al., "Competition-Based Scheme for Motion Vector Selection and Coding," ITU—Telecommunications Standardization Sector, Study Group 16 Question 6, Video Coding Experts Group (VCEG), 29th Meeting: Klagenfurt, Austria, pp. 1-7 (Jul. 2006).
International Search Report and Written Opinion in International Application No. PCT/JP2012/001503 dated May 29, 2012.
International Preliminary Report on Patentability and Written Opinion in PCT International Application No. PCT/JP2012/001503, dated Sep. 10, 2013.
Notification of Reasons for Refusal issued in Japanese Patent Application No. 2012-043273 dated Aug. 12, 2014.
Notification of Reasons for Refusal issued in Korean Patent Application No. 10-2013-7026250 dated Mar. 19, 2015.
Notification of Reasons for Refusal issued in Japanese Patent Application No. 2012-043272 dated May 12, 2015.

* cited by examiner

BLOCKS TO BE PROCESSED

FIG.5

| | | | | | | | |
|---|---|---|---|---|---|---|---|
| | D | $B_4$ | $B_3$ | $B_2$ | $B_1$ | C | |
| | $A_4$ | $I_1$ | $I_2$ | $I_3$ | $I_4$ | $F_4$ | |
| | $A_3$ | $I_5$ | $I_6$ | $I_7$ | $I_8$ | $F_3$ | |
| | $A_2$ | $I_9$ | $I_{10}$ | $I_{11}$ | $I_{12}$ | $F_2$ | |
| | $A_1$ | $I_{13}$ | $I_{14}$ | $I_{15}$ | $I_{16}$ | $F_1$ | |
| | E | $G_4$ | $G_3$ | $G_2$ | $G_1$ | H | |
| | | | | | | | |

BLOCKS ON ColPic AT THE SAME POSITIONS AS BLOCKS TO BE PROCESSED

FIG.19

| POC DIFFERENCE | THRESHOLD SIZE |
|---|---|
| 1 | 4x4 |
| 2 | 8x8 |
| 4 | 16x16 |
| 8 | 32x32 |

FIG.23

```
SPS()
{
        ...
        mv_compression_flag;
        if (mv_compression_flag) {
                mv_compression_ratio;
                temporal_mv_restrict_idc;
        }
        ...
}
```

FIG.28

| PREDICTIVE ENCODING MODE | NUMBER OF ENCODE VECTORS | MOTION COMPENSATING PREDICTION DIRECTION |
|---|---|---|
| UniPred | 1 | UNIDIRECTIONAL |
| BiPred | 2 | BIDIRECTIONAL |
| Temporal Direct | 0 | BIDIRECTIONAL |
| Spatial Direct | 0 | BIDIRECTIONAL |
| Intra | 0 | — |

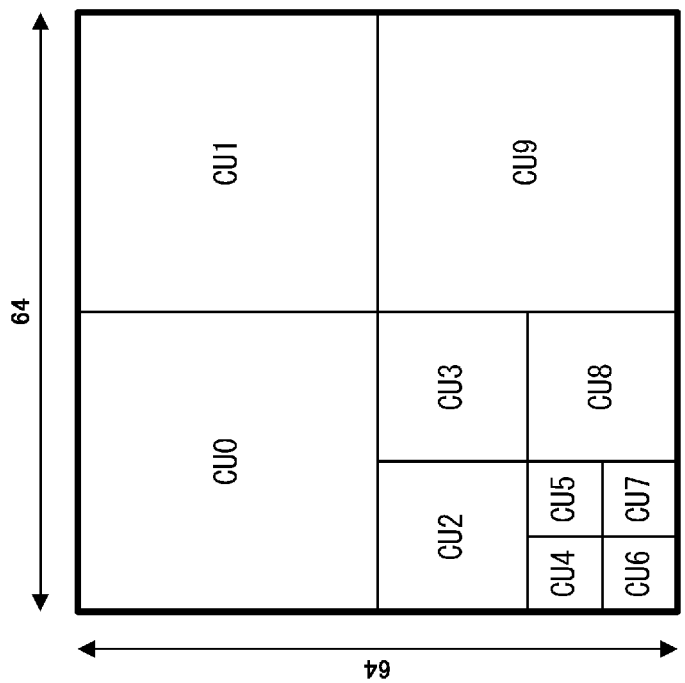

FIG.32

| NUMBER OF CU DIVISIONS | PREDICTIVE BLOCK SIZE | | | |
|---|---|---|---|---|
| 0 | 64x64 | 64x32 | 32x64 | – |
| 1 | 32x32 | 32x16 | 16x32 | – |
| 2 | 16x16 | 16x8 | 8x16 | – |
| 3 | 8x8 | 8x4 | 4x8 | 4x4 |

FIG.33

```
PU()
{
    ...
    merge_flag
    if (merge_flag)
    {
        if (NumMergeCands(L0) > 1)
            merge_idx;
    }
    else {
        bipred_flag;
        ref_idx_l0;
        mvd_l0[0];
        mvd_l0[1];
        if (NumMvpCands(L0) > 1)
            mvp_idx_l0;
        if (bipred_flag) {
            ref_idx_l1;
            mvd_l1[0];
            mvd_l1[1];
            if (NumMvpCnads(L1) > 1)
                mvp_idx_l1;
        }
    }
    ...
}
```

FIG.34A

| mvp_idx_lX | CODE ALLOCATION |
|---|---|
| 0 | 0 |
| 1 | 1 |

CODE STRING FOR TWO CANDIDATES

FIG.34B

| mvp_idx_lX | CODE ALLOCATION |
|---|---|
| 0 | 0 |
| 1 | 10 |
| 2 | 11 |

CODE STRING FOR THREE CANDIDATES

FIG.34C

| mvp_idx_lX | CODE ALLOCATION |
|---|---|
| 0 | 0 |
| 1 | 10 |
| 2 | 110 |
| 3 | 111 |

CODE STRING FOR FOUR CANDIDATES though that enhances an encode efficiency in an encode vector by use of a motion vector of another encoded image in MEPG-4AVC.

[Non-patent document 1] ISO/IEC 13818-2 Information technology—Generic coding of moving pictures and associated audio information: Video

[Non-patent document 2] ISO/IEC 14496-10 Information technology—Coding of audio-visual objects—part 10: Advanced Video Coding The methods described in both ISO/IEC 13818-2 Information technology—Generic coding of moving pictures and associated audio information: Video and ISO/IEC 14496-10 Information technology—Coding of audio-visual objects—Part 10: Advanced Video Coding have a problem that since only one vector predictor can be obtained, a prediction accuracy is low and an encode efficiency is not improved. The present inventors have tried to take a method using a plurality of vector predictor candidates, but in this case, indexes for identifying the vector predictor candidates need to be encoded, and thus they have recognized a problem on an increase in codes of the indexes.

MOVING PICTURE ENCODING DEVICE, MOVING PICTURE ENCODING METHOD AND MOVING PICTURE ENCODING PROGRAM AS WELL AS MOVING PICTURE DECODING DEVICE, MOVING PICTURE DECODING METHOD AND MOVING PICTURE DECODING PROGRAM

CROSS REFERENCE TO RELATED APPLICATIONS

This application is a Continuation of U.S. patent application Ser. No. 15/332,142, filed Oct. 24, 2016, which is a Continuation of U.S. patent application Ser. No. 14/927,173, filed Oct. 29, 2015, now U.S. Pat. No. 9,516,318, which is a Continuation of U.S. patent application Ser. No. 14/020,644, filed Sep. 6, 2013, now U.S. Pat. No. 9,204,147, which is a Continuation of PCT International Application No. PCT/JP2012/001503, filed Mar. 5, 2012, which claims the benefit of Japanese Patent Application Nos. 2011-050118 and 2011-050119, filed Mar. 8, 2011, 2011-118339 and 2011-118340, filed May 26, 2011, and 2012-043273 and 2012-043272, filed Feb. 29, 2012.

BACKGROUND

The present invention relates to moving picture encoding and decoding techniques using motion compensating prediction, and particularly to techniques for encoding and decoding a motion vector used for motion compensating prediction.

Motion compensating prediction is used in typical moving picture compression encoding. The motion compensating prediction is a technique for dividing an image of interest into fine blocks, assuming a decoded image as a reference image, and generating, as a predictive signal, a reference image moved from the same positions as blocks of interest in the image of interest by the amount of motion in a motion direction indicated by a motion vector. The motion compensating prediction may be performed by one motion vector unidirectionally and may be performed by two motion vectors bidirectionally.

For the motion vector, a motion vector of encoded neighboring blocks to blocks to be processed is assumed as a motion vector predictor (which will be denoted as "vector predictor" simply), and a difference between the motion vector of the blocks to be processed and the vector predictor is found and the differential vector is transmitted as an encode vector, thereby enhancing a compression efficiency.

A block size of the motion compensating prediction is further reduced and is made more varied in MPEG-4AVC than in MPEG-2, thereby enhancing an efficiency in motion compensating prediction. On the other hand, the reduced block size causes an increase in motion vectors, and thus there is a problem on the amount of codes in an encode vector.

A motion vector of a left-adjacent block to blocks to be processed is simply assumed as a vector predictor in MPEG-2 (ISO/IEC 13818-2 Information technology—Generic coding of moving pictures and associated audio information: Video), but a median of the motion vectors of a plurality of neighboring blocks is assumed as a vector predictor in MPEG-4AVC, thereby enhancing an accuracy of the vector predictor and preventing an increase in codes of the encode vector (ISO/IEC 14496-10 Information technology—Coding of audio-visual objects—Part 10: Advanced Video Coding). Further, there is known a technique

SUMMARY

The present invention has been made in terms of such situations, and an object thereof is to provide moving picture encoding and decoding techniques capable of enhancing an accuracy of motion vector prediction and an encode efficiency.

In order to solve the above-described problem, a moving picture encoding device according to an aspect of the present invention is a moving picture encoding device with motion compensating prediction in units of block, including a motion vector predictor candidate generating unit (133) configured to, when a block size of blocks to be decoded is larger than a predetermined threshold size, derive motion vector predictor candidates from blocks in a decoded image, and when the block size of the blocks to be decoded is smaller than or equal to the predetermined threshold size, configured not to derive the motion vector predictor candidates.

Another aspect of the present invention is also a moving picture encoding device. The device is a moving picture encoding device with motion compensating prediction in units of block, including a motion vector predictor candidate list generating unit (133) configured to, when a block size of blocks to be encoded is larger than a predetermined threshold size, contain motion vector predictor candidates obtained from blocks in an encoded image in a motion vector predictor candidate list, and when the block size of the blocks to be encoded is smaller than or equal to the predetermined threshold size, configured not to contain the motion vector predictor candidates in the motion vector predictor candidate list, a motion vector predictor selecting unit (121) configured to select a motion vector predictor of the blocks to be encoded from the motion vector predictor candidate list, and an encoding unit (104) configured to encode information on the position of the selected motion vector predictor from the motion vector predictor candidate list.

Still another aspect of the present invention is also a moving picture encoding device. The device is a moving picture encoding device with motion compensating prediction in units of block, including a spatial motion vector predictor candidate generating unit (130) configured to derive spatial motion vector predictor candidates from neighboring blocks to blocks to be encoded, a temporal motion vector predictor candidate generating unit (132) configured to derive temporal motion vector predictor candidates from blocks in an encoded image, a motion vector predictor candidate list generating unit (133) configured to, when use permission information indicating whether to permit the use of a temporal motion vector predictor indicates permission, generate a motion vector predictor candidate list from the special motion vector predictor candidates and the temporal motion vector predictor candidates, and when the use permission information indicates non-permission, generate a motion vector predictor candidate list from the spatial motion vector predictor candidates, a motion vector predictor selecting unit (121) configured to select a motion vector predictor of the blocks to be encoded from the motion vector predictor candidate list, and an encoding unit (104) configured to encode information on the position of the selected motion vector predictor from the motion vector predictor candidate list.

Still another aspect of the present invention is also a moving picture encoding device. The device is a moving picture encoding device with motion compensating prediction with a plurality of block sizes, including a first vector predictor candidate list generating unit (130) configured to generate a first vector predictor candidate list containing first motion vector predictor candidates from motion vectors of one or more encoded neighboring blocks to blocks to be encoded, a second vector predictor candidate list generating unit (132) configured to generate a second vector predictor candidate list containing second motion vector predictor candidates from motion vectors of blocks at the same positions as the blocks to be encoded in an encoded image and one or more neighboring blocks to the blocks at the same positions, a combination determining unit (131) configured to determine whether to generate a third vector predictor candidate list combining the first vector predictor candidate list and the second vector predictor candidate list by a comparison result between a block size of the blocks to be encoded and a predetermined threshold size, a third vector predictor candidate list generating unit (133) configured to, when the block size of the blocks to be encoded is smaller than the predetermined threshold size, generate the third vector predictor candidate list from the first vector predictor candidate list without combining the second vector predictor candidate list, a vector predictor selecting unit (121) configured to select a motion vector predictor of the blocks to be encoded from the third vector predictor candidate list, and an encoding unit (104) configured to encode information on the position of the selected motion vector predictor from the third vector predictor candidate list.

Still another aspect of the present invention is also a moving picture encoding device. The device is a moving picture encoding device with motion compensating prediction by a plurality of block sizes, including a first motion vector storing unit (111) configured to store and manage motion vectors of encoded blocks in a memory area allocated in units of minimum block size, a first vector predictor candidate list generating unit (130) configured to generate a first vector predictor candidate list containing first motion vector predictor candidates from motion vectors of one or more encoded neighboring blocks to blocks to be encoded with reference to the first motion vector storing unit (111), a second motion vector storing unit (302) configured to put together motion vectors in units of minimum block size in an encoded image with a predetermined compression size to be replaced with one representative motion vector, and store and manage it in a memory area allocated in units of compression size, a second vector predictor candidate list generating unit (132) configured to generate a second vector predictor candidate list containing second motion vector predictor candidates from motion vectors of blocks at the same positions as the blocks to be encoded in an encoded image and one or more neighboring blocks to the blocks at the same positions with reference to the second motion vector storing unit (302), a combination determining unit (131) configured to determine whether to generate a third vector predictor candidate list combining the first vector predictor candidate list and the second vector predictor candidate list by a comparison result between a block size of the blocks to be encoded and a predetermined threshold size, a third vector predictor candidate list generating unit (133) configured to, when the block size of the blocks to be encoded is smaller than the predetermined threshold size, generate the third vector predictor candidate list form the first vector predictor candidate list without combining the second vector predictor candidate list, a vector predictor selecting unit (121) configured to select a motion vector predictor of the blocks to be encoded from the third vector predictor candidate list, and an encoding unit (104) configured to encode information on the position of the selected motion vector predictor from the third vector predictor candidate list.

Still another aspect of the present invention is also a moving picture encoding method. The method is a moving picture encoding method with motion compensating prediction in units of block, including a motion vector predictor candidate generating step of, when a block size of blocks to be encoded is larger than a predetermined threshold size, deriving motion vector predictor candidates from blocks in an encoded image, and when the block size of the blocks to be encoded is smaller than or equal to the predetermined threshold size, not deriving the motion vector predictor candidates.

Still another aspect of the present invention is also a moving picture encoding method. The method is a moving picture encoding method with motion compensating prediction in units of block, including a motion vector predictor candidate list generating step of, when a block size of blocks to be encoded is larger than a predetermined threshold size, containing motion vector predictor candidates obtained from blocks in an encoded image in a motion vector predictor candidate list, and when the block size of the blocks to be encoded is smaller than or equal to the predetermined threshold size, not containing the motion vector predictor candidates in the motion vector predictor candidate list, a motion vector predictor selecting step of selecting a motion vector predictor of the blocks to be encoded from the motion vector predictor candidate list, and an encoding step of encoding information on the position of the selected motion vector predictor from the motion vector predictor candidate list.

Still another aspect of the present invention is also a moving picture encoding method. The method is a moving picture encoding method with motion compensating prediction in units of block, including a spatial motion vector predictor candidate generating step of deriving spatial motion vector predictor candidates from neighboring blocks to blocks to be encoded, a temporal motion vector predictor candidate generating step of deriving temporal motion vector predictor candidates from blocks in an encoded image, a motion vector predictor candidate list generating step of, when use permission information indicating whether to permit the use of a temporal motion vector predictor indicates permission, generating a motion vector predictor candidate list from the spatial motion vector predictor candidates and the temporal motion vector predictor candidates, and when the use permission information indicates non-permission, generating a motion vector predictor candidate list from the spatial motion vector predictor candidates, a motion vector predictor selecting step of selecting a motion vector predictor of the blocks to be encoded from the motion vector predictor candidate list, and an encoding step of encoding information on the position of the selected motion vector predictor from the motion vector predictor candidate list.

A moving picture decoding device according to an aspect of the present invention is a moving picture decoding device with motion compensating prediction in units of block, including a motion vector predictor candidate generating unit (133) configured to, when a block size of blocks to be decoded is larger than a predetermined threshold size, derive motion vector predictor candidates from blocks in a decoded image, and when the block size of the blocks to be decoded is smaller than or equal to the predetermined threshold size, configured not to derive the motion vector predictor candidates.

Still another aspect of the present invention is a moving picture decoding device. The device is a moving picture decoding device with motion compensating prediction in units of block, including a motion vector predictor candidate list generating unit (133) configured to, when a block size of blocks to be decoded is larger than a predetermined threshold size, contain motion vector predictor candidates obtained from blocks in a decoded image in a motion vector predictor candidate list, and when the block size of the blocks to be decoded is smaller than or equal to the predetermined threshold size, configured not to contain the motion vector predictor candidates in the motion vector predictor candidate list, a decoding unit (201) configured to decode information on the position of a motion vector predictor to be referred to in the motion vector predictor candidate list, and a motion vector predictor selecting unit (221) configured to select a motion vector predictor of the blocks to be decoded from the motion vector predictor candidate list based on the information on the position of a motion vector predictor to be referred to in the motion vector predictor candidate list.

Still another aspect of the present invention is also a moving picture decoding device. The device is a moving picture decoding device with motion compensating prediction in units of block, including a decoding unit (201) configured to decode information on the position of a motion vector predictor to be referred to in a motion vector predictor candidate list, a spatial motion vector predictor candidate generating unit (130) configured to derive spatial motion vector predictor candidates from neighboring blocks to blocks to be decoded, a temporal motion vector predictor candidate generating unit (132) configured to derive temporal motion vector predictor candidates from blocks in a decoded image, a motion vector predictor candidate list generating unit (133) configured to, when use permission information indicating whether to permit the use of a temporal motion vector predictor indicates permission, generate a motion vector predictor candidate list from the spatial motion vector predictor candidates and the temporal motion vector predictor candidates, and when the use permission information indicates non-permission, generate a motion vector predictor candidate list from the spatial motion vector predictor candidates, and a motion vector predictor selecting unit (221) configured to select a motion vector predictor of the blocks to be decoded from the motion vector predictor candidate list based on the information on the position of the motion vector predictor.

Still another aspect of the present invention is also a moving picture decoding device. The device is a moving picture decoding device with motion compensating prediction by a plurality of block sizes, including a decoding unit (201) configured to decode information on the position of a motion vector predictor to be referred to in a vector predictor candidate list, a first vector predictor candidate list generating unit (130) configured to generate a first vector predictor candidate list containing first motion vector predictor candidates from motion vectors of one or more decoded neighboring blocks to blocks to be decoded, a second vector predictor candidate list generating unit (132) configured to generate a second vector predictor candidate list containing second motion vector predictor candidates from motion vectors of blocks at the same positions as the blocks to be decoded in a decoded image and one or more neighboring blocks to the blocks at the same positions, a combination determining unit (131) configured to determine whether to generate a third vector predictor candidate list combining the first vector predictor candidate list and the second vector predictor candidate list by a comparison result between a block size of the blocks to be decoded and a predetermined threshold size, a third vector predictor candidate list generating unit (133) configured to generate the third vector predictor candidate list from the first vector predictor candidate list without combining the second vector predictor candidate list when the block size of the blocks to be decoded is smaller than the predetermined threshold size, and a vector predictor selecting unit (221) configured to select a motion vector predictor of the blocks to be decoded from the third vector predictor candidate list based on the information on the position of the motion vector predictor to be referred to.

Still another aspect of the present invention is also a moving picture decoding device. The device is a moving picture decoding device with motion compensating prediction by a plurality of block sizes, including a decoding unit (201) configured to decode information on the position of a motion vector predictor to be referred to in a vector predictor candidate list, a first motion vector storing unit (207) configured to store and manage motion vectors of decoded blocks in a memory area allocated in units of minimum block size, a first vector predictor candidate list generating unit (130) configured to generate a first vector predictor candidate list containing first motion vector predictor candidates from motion vectors of one or more decoded neighboring blocks to blocks to be decoded with reference to the first motion vector storing unit (207), a second motion vector storing unit (402) configured to put together motion vectors in units of minimum block size of a decoded image with a predetermined compression size to be replaced with one representative motion vector, and store and manage it in a memory area allocated in units of compression size, a second vector predictor candidate list generating unit (132) configured to generate a second vector predictor candidate list containing second motion vector predictor candidates from motion vectors of blocks at the same positions as the blocks to be decoded in a decoded image and one or more neighboring blocks to the blocks at the same positions with reference to the second motion vector storing unit (402), a combination determining unit (131) configured to determine whether to generate a third vector predictor candidate list combining the first vector predictor candidate list and the second vector predictor candidate list by a comparison result between a block size of the blocks to be decoded and a predetermined threshold size, a third vector predictor candidate list generating unit (133) configured to generate the third vector predictor candidate list from the first vector predictor candidate list without combining the second vector predictor candidate list when the block size of the blocks to be decoded is smaller than the predetermined threshold size, and a vector predictor selecting unit (221) configured to select a motion vector predictor of the blocks to be decoded from the third vector predictor candidate list based on the information on the position of the motion vector predictor to be referred to.

Still another aspect of the present invention is a moving picture decoding method. The method is a moving picture decoding method with motion compensating prediction in units of block, including a motion vector predictor candidate generating step of, when a block size of blocks to be decoded is larger than a predetermined threshold size, deriving motion vector predictor candidates from blocks in a decoded image, and when the block size of the blocks to be decoded is smaller than or equal to the predetermined threshold size, not deriving the motion vector predictor candidates.

Still another aspect of the present invention is also a moving picture decoding method. The method is a moving picture decoding method with motion compensating prediction in units of block, including a motion vector predictor candidate list generating step of, when a block size of blocks to be decoded is larger than a predetermined threshold size, containing motion vector predictor candidates obtained from blocks in a decoded image in a motion vector predictor candidate list, and when the block size of the blocks to be decoded is smaller than or equal to the predetermined threshold size, not containing the motion vector predictor candidates in the motion vector predictor candidate list, a decoding step of decoding information on the position of a motion vector predictor to be referred to in the motion vector predictor candidate list, and a motion vector predictor selecting step of selecting a motion vector predictor of the blocks to be decoded from the motion vector predictor candidate list based on the information on the position of a motion vector predictor to be referred to in the motion vector predictor candidate list.

Still another aspect of the present invention is also a moving picture decoding method. The method is a moving picture decoding method with motion compensating prediction in units of block, including a decoding step of decoding information on the position of a motion vector predictor to be referred to in a motion vector predictor candidate list, a spatial motion vector predictor candidate generating step of deriving spatial motion vector predictor candidates from neighboring blocks to blocks to be decoded, a temporal motion vector predictor candidate generating step of deriving temporal motion vector predictor candidates from blocks in a decoded image, a motion vector predictor candidate list generating step of, when use permission information indicating whether to permit the use of a temporal motion vector predictor indicates permission, generating a motion vector predictor candidate list from the spatial motion vector predictor candidates and the temporal motion vector predictor candidates, and when the use permission information indicates non-permission, generating a motion vector predictor candidate list from the spatial motion vector predictor candidates, and a motion vector predictor selecting step of selecting a motion vector predictor of the blocks to be decoded from the motion vector predictor candidate list based on the information on the position of the motion vector predictor.

Any combinations of the above components, converted expressions according to the present invention between methods, devices, systems, recording mediums or computer programs are effective as forms according to the present invention.

BRIEF DESCRIPTION OF THE DRAWINGS

FIG. 5 is a diagram for explaining a second group of candidate blocks;

FIG. 19 is a diagram for explaining a predetermined threshold size by a POC difference according to the extended example of the first embodiment;

FIG. 23 is a diagram for explaining part of SPS syntax according to the second embodiment;

FIG. 28 is a diagram for explaining a predictive encoding mode;

FIGS. 30A to 30B are diagrams for explaining coding blocks;

FIG. 32 is a diagram for explaining predictive block sizes;

FIG. 33 is a diagram for explaining exemplary syntax of a predictive block; and

FIGS. 34A to 34C are diagrams for explaining a Truncated Unary code string.

DETAILED DESCRIPTION

Figure 1:
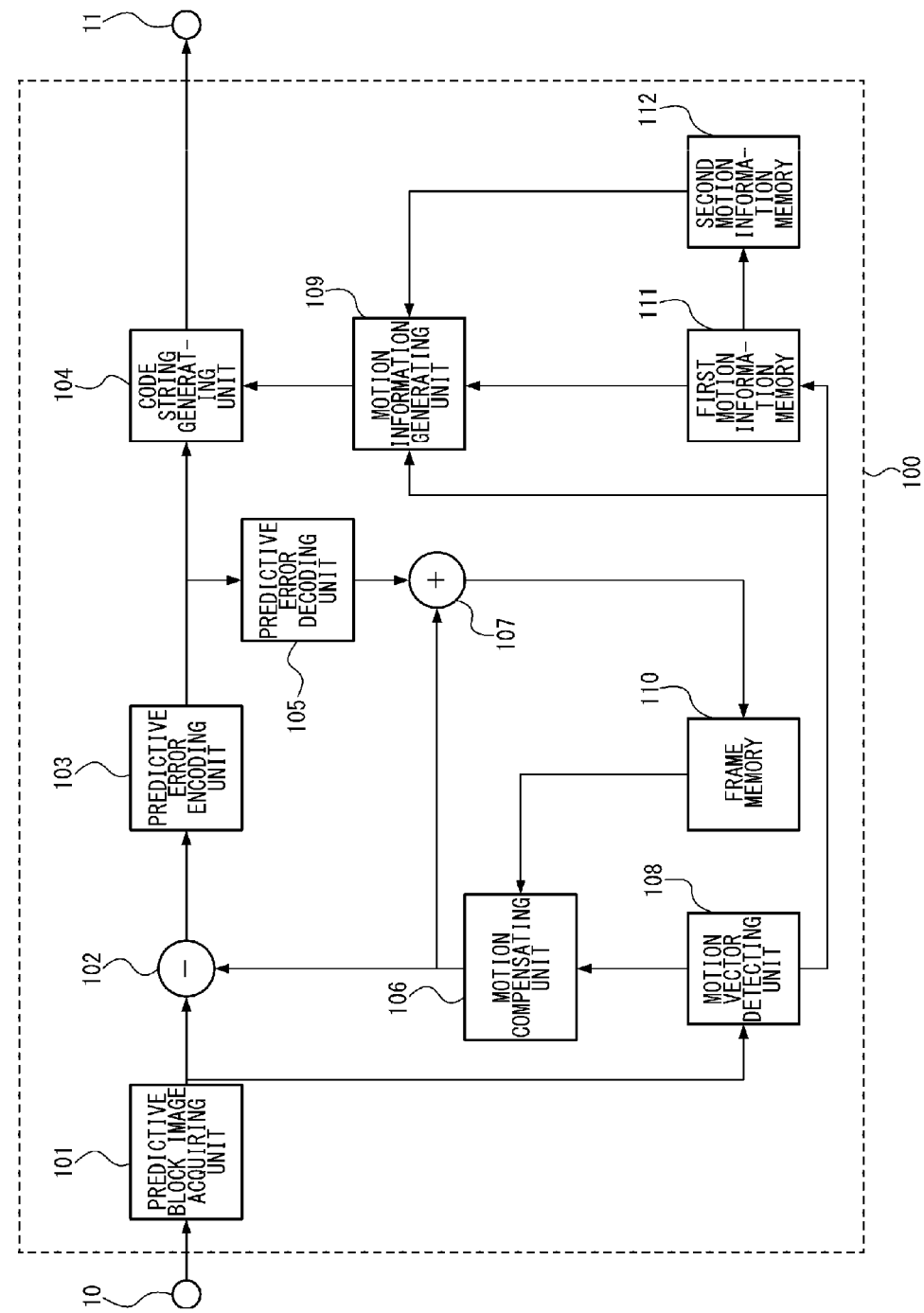
FIG. 1 is a diagram for explaining a structure of a moving picture encoding device according to a first embodiment.

The invention will now be described by reference to the preferred embodiments. This does not intend to limit the scope of the present invention, but to exemplify the invention.

Premise techniques for embodiments according to the present invention will be described first.

At present, devices and systems conforming to an encoding system such as Moving Picture Experts Group (MPEG) are widely used. In the encoding system, a plurality of continuous images on a time axis is handled as information on digital signals. At this time, motion compensating prediction using a redundancy in a temporal direction, and orthogonal transform such as discrete cosine transform using a redundancy in a spatial direction are used to perform compression encoding in order to broadcast, transmit or store information at high efficiency.

In 1995, the MPEG-2 video (ISO/IEC 13818-2) encoding system is established as a general video compression encoding system, and is widely used for applications including storage mediums such as magnetic tape for Digital Versatile Disk (DVD) and D-VHS (registered trademark) standards' digital VTR, and digital broadcasting.

Further, in 2003, an encoding system called MPEG-4 AVC/H.264 (which is assigned with the standard numbers of 14496-10 in ISO/IEC and H.264 in ITU-T, and which will be called MPEG-4AVC below) is established as an international standard by the cooperative activity between the Joint Technical Committee (ISO/IEC) of International Organization for Standardization (ISO) and International Electrotechnical Commission (IEC), and International Telecommunication Union Telecommunication Standardization Sector (ITU-T).

At present, an encoding system called HEVC is being discussed for its standardization by the cooperative activity between the Joint Technical Committee (ISO/IEC) of International Organization for Standardization (ISO) and International Electrotechnical Commission (IEC), and International Telecommunication Union Telecommunication Standardization Sector (ITU-T).

(Predictive Encoding Mode)

According to the embodiments of the present invention, a motion compensating prediction direction or the number of encode vectors can be switched in various block sizes.

Exemplary predictive encoding modes in which a motion compensating prediction direction and the number of encode vectors are associated will be described herein briefly with reference to FIG. 28.

There are a unidirectional mode (UniPred) in which the motion compensating prediction direction is unidirectional and the number of encode vectors is 1, a bidirectional mode (BiPred) in which the motion compensating prediction direction is bidirectional and the number of encode vectors is 2, a temporal direct mode (Temporal Direct) in which the motion compensating prediction direction is bidirectional and the number of encode vectors is 0, and a spatial direct mode (Spatial Direct). There is also an intra model (Intra) as a predictive encoding mode in which motion compensating prediction is not made.

(Reference Image Index)

According to the embodiments of the present invention, an optimum reference image can be selected from among a plurality of reference images for motion compensating prediction in order to enhance accuracy in motion compensating prediction. Thus, the reference image used for motion compensating prediction is encoded as a reference image index in an encode stream together with an encode vector. The reference image index used for motion compensating prediction is larger than or equal to a numerical value of 0.

(Coding Block)

Figure 29:
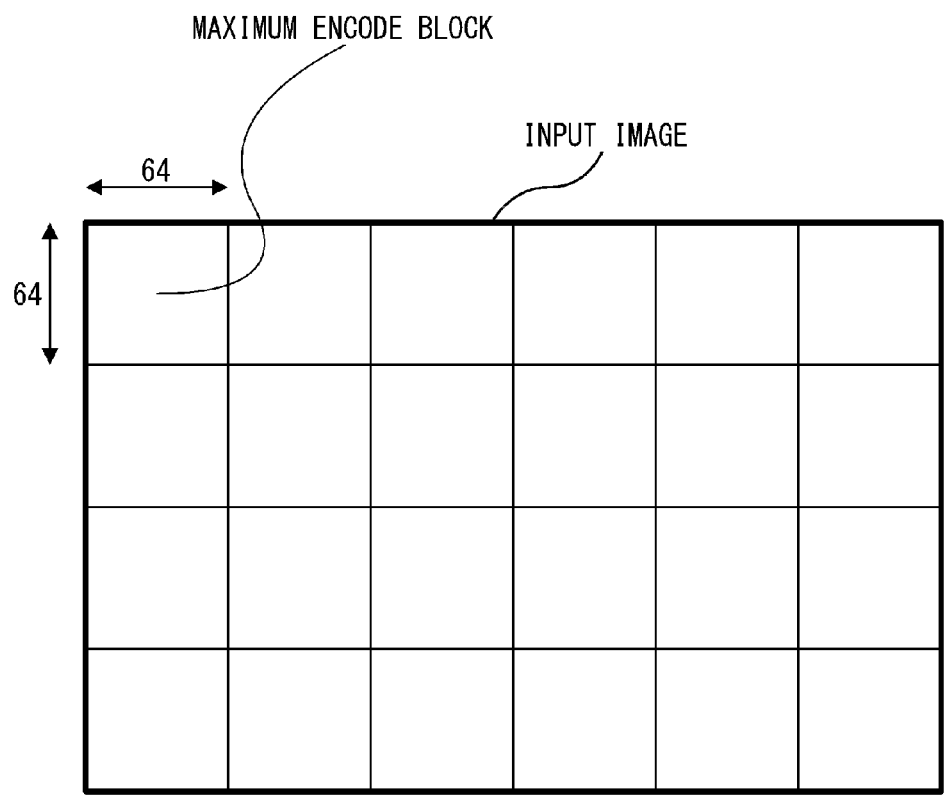
FIG. 29 is a diagram for explaining an example of dividing an image into maximum coding blocks.
Figure 31D:
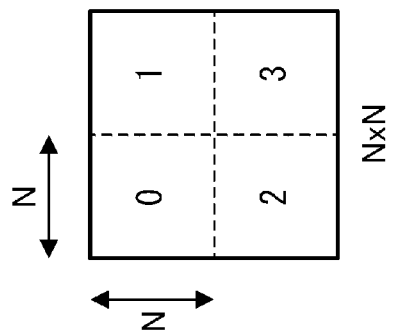
FIGS. 31A to 31D are diagrams for explaining predictive blocks.
Figure 31C:
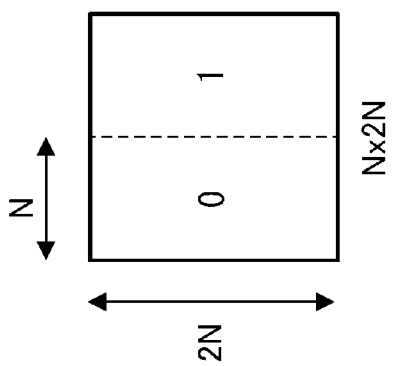
Figure 31B:
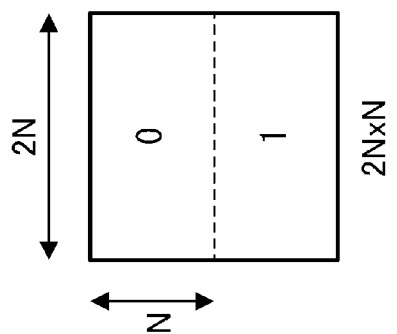
Figure 31A:
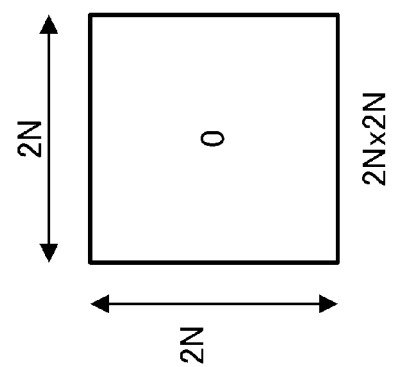

According to the embodiments of the present invention, an input image signal is divided in units of maximum coding block as illustrated in FIG. 29, and the divided coding blocks are processed in a raster scan order.

The coding blocks are in a hierarchy structure, and are sequentially divided into four equal blocks in consideration of an encode efficiency, thereby obtaining smaller coding blocks. The four-divided coding blocks are encoded in a zigzag scan order. The coding block which cannot be further divided is called minimum coding block. The coding block is a unit configured to encode, and the maximum coding block is a coding block when the number of divisions is 0.

According to the present embodiments, the maximum coding block is assumed as 64 pixels×64 pixels, and the minimum coding block is assumed as 8 pixels×8 pixels.

FIGS. 30A to 30B illustrate exemplary division of a maximum coding block. In the example of FIG. 30A, the coding block is divided into 10. CU0, CU1 and CU9 are the coding blocks of 32 pixels×32 pixels, CU2, CU3 and CU8 are the coding blocks of 16 pixels×16 pixels, and CU4, CU5 and CU6 are the coding blocks of 8 pixels×8 pixels.

(Predictive Block)

According to the embodiments of the present invention, the coding block is further divided into predictive blocks. FIGS. 31A to 31D illustrate division patterns of a predictive block. A coding block is not divided for 2N×2N, is divided in the horizontal direction for 2N×N, is divided in the vertical direction for N×2N, and is divided horizontally and vertically for N×N. That is, as illustrated in FIG. 32, 13 predictive block sizes are present from 64 pixels×64 pixels as a maximum predictive block size in case that the number of CU divisions is 0 to 4 pixels×4 pixels as a minimum predictive block size in case that the number of CU divisions is 3.

The embodiments according to the present invention employ the maximum coding block assumed as 64 pixels× 64 pixels and the minimum coding block assumed as 8 pixels×8 pixels, but are not limited to the combination. The predictive block employs the division patterns as illustrated in FIGS. 31A to 31D, but is not limited thereto if it may be divided into one or more.

(Vector Predictor Index)

For HEVC, there is considered that an optimum vector predictor is selected from a plurality of vector predictor candidates and a vector predictor index for indicating the selected vector predictor is encoded in order to further enhance accuracy in vector predictor. There is also considered that a motion vector of another image is used as a vector predictor candidate. In the past moving picture image compression encoding, a motion vector of another image has been used for motion compensating prediction but has not been used as a vector predictor.

According to the embodiments of the present invention, the vector predictor index is introduced and a motion vector of another image is used as a vector predictor candidate.

(Merge Direction Index)

For HEVC, there is considered that an optimum neighboring block is selected from a plurality of neighboring block candidates and a merge direction index (merge index) for indicating the selected neighboring block is encoded and decoded in order to further enhance an encode efficiency. This is a method using motion information (motion vectors, reference image indexes and motion compensating prediction direction) on the selected block indicated by the merge index as it is for blocks to be processed. Also for the method, there is considered that processed blocks of another image are used similarly to the vector predictor index.

(Syntax)

Exemplary syntax of a predictive block according to the present embodiment will be described with reference to FIG. 33. Whether the predictive block is intra or inter is designated by a higher coding block, and FIG. 33 illustrates syntax when the predictive block is inter. There are a merge direction flag (merge_flag), a merge direction index (merge_idx), a motion compensating prediction direction (bi-pred_flag), reference indexes (ref_idx_l0 and ref_idx_l1), differential motion vectors (mvd_l0[0], mvd_l0[1], mvd_l1[0], mvd_l1[1]), and vector predictor indexes (mvp_idx_l0 and mvp_idx_l1).

In FIG. 33, there is NumMvpCands( ) which is a function that calculates the number of vector predictor candidates before decoding (encoding) vector predictor index. This is because the number of vector predictor candidates changes per predictive blocks depending on a situation of neighboring blocks.

When the number of vector predictor candidates is 1, the vector predictor index is not decoded (encoded). This is because the vector predictor can be uniquely decided when the number of vector predictor candidates is 1. NumMvpCands( ) will be described below in details.

Tables of vector predictor index code string will be described with reference to FIGS. 34A to 34C. In the present embodiments, the Truncated Unary code string is used as a vector predictor index code string. FIG. 34A illustrates vector predictor index code strings by the Truncated Unary code string for two vector predictor candidates, FIG. 34B illustrates vector predictor index code strings by the Truncated Unary code string for three vector predictor candidates, and FIG. 34C illustrates vector predictor index code strings by the Truncated Unary code string for four vector predictor candidates.

It can be seen from FIGS. 34A to 34C that also when the same vector predictor index value is encoded, as the number of vector predictor candidates is less, the code bit allocated to the vector predictor index is less. For example, when the vector predictor index is 1, if the number of vector predictor candidates is 2, the code bit is 1 bit with "1", and if the number of vector predictor candidates is 3, the code bit is 2 bits with "10."

As described above, as the number of vector predictor candidates is less, the encode efficiency of the vector predictor index is further enhanced. To the contrary, the number of vector predictor candidates changes per predictive blocks, and thus the number of vector predictor candidates needs to be previously calculated in order to decode the vector predictor index.

While memory access is made to a motion vector of another image only for motion compensating prediction in the past moving picture encoding, in the embodiments according to the present invention, as described above, the number of vector predictor candidates needs to be previously calculated also for calculating vector predictor index, and thus the amount of accesses to the motion vector memory largely increases.

(POC)

In the embodiments according to the present invention, Picture Order Count (POC) is used as image temporal information (distance information). The POC is a counter which indicates an image display order defined in MPEG-4AVC. When the image display order is incremented by 1, the POC is also incremented by 1. Thus, a temporal difference (distance) between images can be acquired from the POC difference between images.

(Property of Motion Vector of Neighboring Blocks)

Typically, a motion vector of blocks to be processed is highly correlated with a motion vector of neighboring blocks to the blocks to be processed when the blocks to be processed and the neighboring blocks to the blocks to be processed move in the same way, for example, when the regions containing the blocks to be processed and the neighboring blocks to the blocks to be processed move in parallel.

(Property of Motion Vector of Another Image)

On the other hand, typically, blocks at the same positions as the a blocks to be processed (same-position blocks) on a different decoded image used in the temporal direction mode or in the spatial direction mode are highly correlated with the blocks to be processed when the same-position blocks and the blocks to be processed are still or when the same-position blocks and the blocks to be processed move in parallel.

(Property of Motion Vector of Small Blocks)

There is typically considered that a block size is smaller when a motion (motion vector) of blocks to be processed is low-correlated with a motion (motion vector) of neighboring blocks that is when the motion is complicated, and in this case, it is less likely that the blocks to be processed and the same-position blocks of the motion vector of another image are still or the blocks to be processed and the same-position blocks move in parallel.

Preferred embodiments of a moving picture encoding device, a moving picture encoding method and a moving picture encoding program according to the present invention will be described below in details with reference to the accompanying drawings. Like reference numerals are denoted to like reference components for describing the drawings, and a repeated explanation thereof will be omitted.

[First Embodiment]

(Structure of Moving Picture Encoding Device 100)

FIG. 1 illustrates a structure of a moving picture encoding device 100 according to a first embodiment of the present invention. The moving picture encoding device 100 is directed for encoding a moving picture signal per predictive blocks in which motion compensating prediction is made. Division of a coding block, determination of a predictive block size and determination of a predictive encoding mode are made by a higher encode controlling unit. The moving picture encoding device 100 is accomplished in hardware such as an information processing device including a Central Processing Unit (CPU), a frame memory and a hard disk. The above components operate so that the moving picture encoding device 100 accomplishes the functional components described later.

Position information on predictive blocks to be processed, a predictive block size, reference image indexes and a motion compensating prediction direction are assumed to be shared in the moving picture encoding device 100, and will not be illustrated.

The moving picture encoding device 100 according to the present embodiment includes a predictive block image acquiring unit 101, a subtracting unit 102, a predictive error encoding unit 103, a code string generating unit 104, a predictive error decoding unit 105, a motion compensating unit 106, an adding unit 107, a motion vector detecting unit 108, a motion information generating unit 109, a frame memory 110, a first motion information memory 111 and a second motion information memory 112.

(Functions of Moving Picture Encoding Device 100)

The functions of the respective units will be described below.

The predictive block image acquiring unit 101 acquires an image signal of predictive blocks to be processed from image signals supplied from a terminal 10 based on the position information on the predictive blocks and the predictive block size, and supplies the image signal of the predictive blocks to the subtracting unit 102 and the motion vector detecting unit 108.

The subtracting unit 102 subtracts the image signal supplied from the predictive block image acquiring unit 101 and a predictive signal supplied from the motion compensating unit 106 to calculate a predictive error signal, and supplies the predictive error signal to the predictive error encoding unit 103.

The predictive error encoding unit 103 performs the processes such as quantization and orthogonal transform on the predictive error signal supplied from the subtracting unit 102 to generate predictive error encode data, and supplies the predictive error encode data to the code string generating unit 104 and the predictive error decoding unit 105.

The code string generating unit 104 entropy-encodes the predictive error encode data supplied from the predictive error encoding unit 103 as well as a differential vector and a vector predictor index supplied from the motion information generating unit 109 according to syntax together with a motion compensating prediction direction and a reference index to generate a code string, and supplies the code string to a terminal 11.

In the present embodiment, the Truncated Unary code string is used for encoding a vector predictor index as described above, but, not limited thereto, any code string capable of being encoded by a vector predictor index with less bits as the number of vector predictor candidates is less may be employed.

The predictive error decoding unit 105 performs the processes such as inverse quantization and inverse orthogonal transform on the predictive error encode data supplied from the predictive error encoding unit 103 to generate a predictive error signal, and supplies the predictive error signal to the adding unit 107.

The motion compensating unit 106 motion compensates a reference image in the frame memory 110 by a motion vector supplied from the motion vector detecting unit 108 to generate a predictive signal. When the motion compensating prediction direction is bidirectional, the predictive signals in the respective directions are averaged to be a predictive signal, and the predictive signal is supplied to the adding unit 107.

The adding unit 107 adds the predictive error signal supplied from the predictive error decoding unit 105 and the predictive signal supplied from the motion compensating unit 106 to generate a decoded image signal, and supplies the decoded image signal to the frame memory 110.

The motion vector detecting unit 108 detects a motion vector from an image signal with a different time from the image signal supplied from the predictive block image acquiring unit 101, and supplies the motion vector to the motion compensating unit 106. When the motion compensating prediction direction is bidirectional, the motion vectors in the respective directions are detected, and the motion vectors are supplied to the motion compensating unit 106.

With a typical motion vector detecting method, an error evaluation value is calculated for a different image signal moved from the same position as the image signal by a predetermined amount of movement, and the amount of movement with a minimum error evaluation value is assumed as a motion vector. The error evaluation value may use Sum of Absolute Difference (SAD) indicating a sum of absolute differences or Mean Square Error (MSE) indicating a mean square error.

The motion information generating unit 109 generates a differential vector and a vector predictor index from the motion vector supplied from the motion vector detecting unit 108, a first group of candidate blocks supplied from the first motion information memory 111 and a second group of candidate blocks supplied from the second motion information memory 112, and supplies the differential vector and the vector predictor index to the code string generating unit 104.

A detailed structure of the motion information generating unit 109 will be described later.

The frame memory 110 stores the decoded image signal supplied from the adding unit 107. Further, it stores one or a predetermined number of decoded images which are completely decoded as reference images, and supplies a reference image signal to the motion compensating unit 106. The storage area storing the reference images is controlled in the First In First Out (FIFO) system.

The first motion information memory 111 stores the motion vectors and the reference image indexes supplied from the motion vector detecting unit 108 for one image per minimum predictive block size, and supplies information on neighboring blocks to the predictive blocks to be processed as a first group of candidate blocks to the motion information generating unit 109. When the entire image is completely processed, the first motion information memory 111 moves the stored motion vectors and reference image indexes to the second motion information memory 112.

The second motion information memory 112 stores the motion vectors and the reference image indexes supplied from the first motion information memory 111 for a predetermined number of images, and supplies blocks on ColPic at the same positions as the predictive blocks to be processed, and its neighboring blocks as a second group of candidate blocks to the motion information generating unit 109. The storage area storing the motion vectors and the reference image indexes is synchronized with the frame memory 110, and is controlled in the First In First Out (FIFO) system. ColPic is a different decoded image from the predictive blocks to be processed, and is stored as a reference image in the frame memory 110. In the present embodiment, ColPic is assumed as an immediately-previous decoded reference image. In the present embodiment, ColPic is assumed as an immediately-previous decoded reference image, but may be an immediately-previous reference image in the display order or an immediately-subsequent reference image in the display order, or any reference image in an encode stream may be designated.

Figure 2:
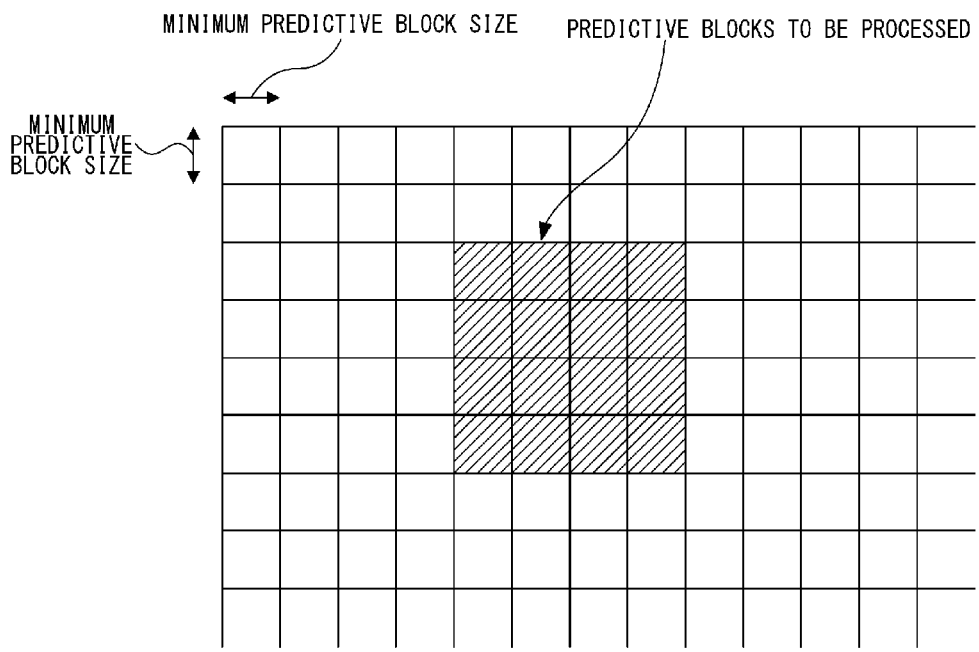
FIG. 2 is a diagram for explaining a method for managing motion vectors and reference image indexes in a first motion information memory and a second motion information memory of FIG. 1.

A method for managing the motion vectors and the reference image indexes in the first motion information memory 111 and the second motion information memory 112 will be described herein with reference to FIG. 2. The motion vectors and the reference image indexes are stored in each memory area per minimum predictive block. FIG. 2 illustrates that a predictive block size to be processed is 16 pixels×16 pixels. In this case, the motion vectors and the reference image indexes of the predictive blocks are stored in 16 shaded memory areas in FIG. 2.

When the prediction encoding mode is the intra mode, (0, 0) is stored as the motion vector and -1 is stored as the reference image index. The reference image index may take any value other than −1 if the mode can be determined as not making motion compensating prediction.

In the following, unless otherwise stated, a simple expression of block means a minimum predictive block unit.

Figure 3:
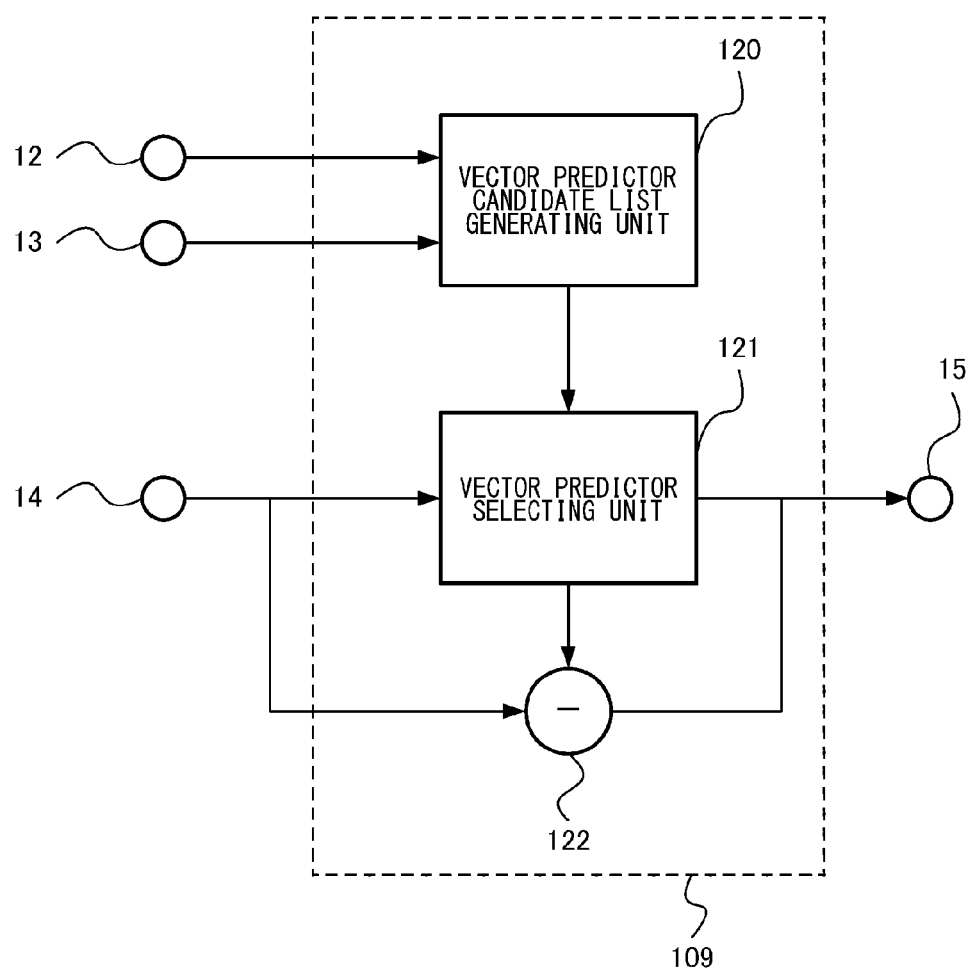
FIG. 3 is a diagram for explaining a structure of a motion information generating unit of FIG. 1.

Subsequently, a detailed structure of the motion information generating unit 109 characteristic of the present embodiment will be described with reference to FIG. 3. FIG. 3 illustrates a structure of the motion information generating unit 109.

The motion information generating unit 109 includes a vector predictor candidate list generating unit 120, a vector predictor selecting unit 121 and a subtracting unit 122. A terminal 12, a terminal 13, a terminal 14 and a terminal 15 are connected to the first motion information memory 111, the second motion information memory 112, the motion vector detecting unit 108, and the code string generating unit 104, respectively.

The vector predictor candidate list generating unit 120 is similarly arranged in a moving picture decoding device for decoding a code string generated by the moving picture encoding device according to the present embodiment, where a non-contradictory vector predictor candidate list is generated in both the moving picture encoding device and the moving picture decoding device.

NumMvpCands( ) described in syntax returns the number of vector predictor candidates contained in the vector predictor candidate list generated by the vector predictor candidate list generating unit 120.

The functions of the respective units will be described below.

The vector predictor candidate list generating unit 120 generates a vector predictor candidate list from the first group of candidate blocks supplied from the terminal 12 and the second group of candidate blocks supplied from the terminal 13, and supplies the vector predictor candidate list to the vector predictor selecting unit 121.

(Group of Candidate Blocks)

Figure 4:
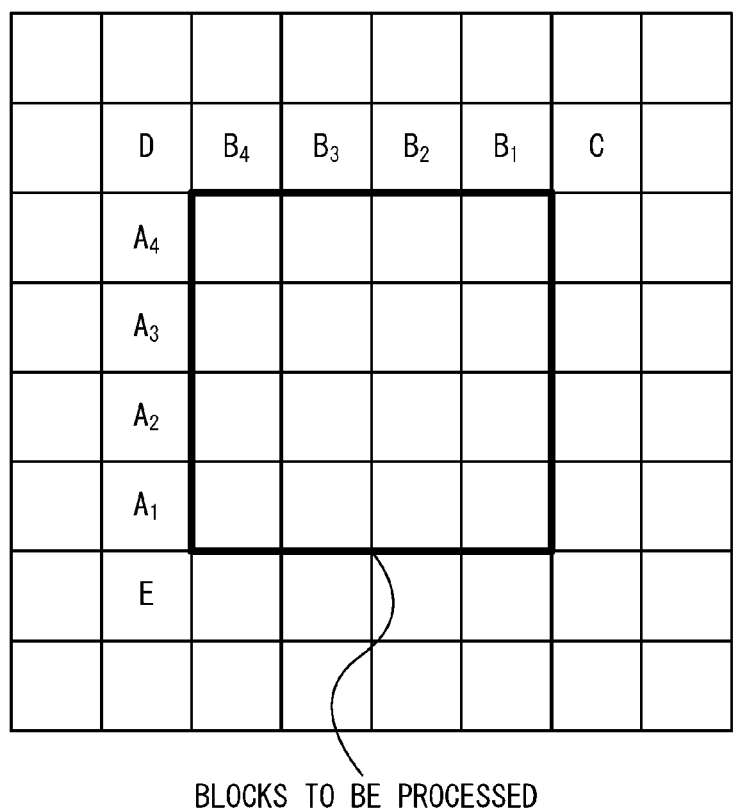
FIG. 4 is a diagram for explaining a first group of candidate blocks.

The first group of candidate blocks will be described herein with reference to FIG. 4. FIG. 4 illustrates that a predictive block size to be processed is 16 pixels×16 pixels. As illustrated in FIG. 4, the neighboring blocks to the predictive blocks to be processed include the left-positioned block A1, block A2, block A3, block A4, the upper-positioned block B1, block B2, block B3, block B4, the upper-right-positioned block C, the upper-left-positioned block D, and the lower-left-positioned block E, which are assumed as a first group of candidate blocks.

The first group of candidate blocks according to the present embodiment is as illustrated in FIG. 4, but in the embodiments of the present invention, the first group of candidate blocks may include at least one processed neighboring block to the predictive blocks to be processed, and is not limited to that in FIG. 4. For example, one block may be selected in each direction to be block A1, block C, block D, block B1, and block E.

The second group of candidate blocks will be described below with reference to FIG. 5. FIG. 5 illustrates that a predictive block size to be processed is 16 pixels×16 pixels. As illustrated in FIG. 5, the blocks in the predictive blocks on ColPic at the same positions as the predictive blocks to be processed, and their neighboring blocks are assumed as a second group of candidate blocks. Specifically, there is assumed a second group of candidate blocks including the block I1 to block I16 in the predictive blocks on ColPic at the same positions as the predictive blocks to be processed, left-positioned block A1 to block A4, the upper-positioned block B1 to block B4, the upper-right-positioned block C, the upper-left-positioned block D, the lower-left-positioned block E, the right-positioned block F1 to block F4, the lower-positioned block G1 to G4, and the lower-right-positioned block H.

The second group of candidate blocks according to the present embodiment includes the block I1 to block I16 on ColPic, the block A1 to block A4, the block B1 to block B4, the block C, the block D, the block E, the block F1 to block F4, the block G1 to block G4, and the block H, but in the embodiments according to the present invention, the second group of candidate blocks may include one or more blocks on a different decoded image from the predictive blocks to be processed, and is not limited to the above. The second group of candidate blocks may include one block, for example only the block I1 or only the block H.

The vector predictor selecting unit 121 selects a vector predictor corresponding to a motion vector supplied from the terminal 14 from the vector predictor candidate list supplied from the vector predictor candidate list generating unit 120, supplies the vector predictor to the subtracting unit 122, and outputs a vector predictor index as information on the selected vector predictor to the terminal 15.

The subtracting unit 122 subtracts the vector predictor supplied from the vector predictor selecting unit 121 from the motion vector supplied from the terminal 14 to calculate a differential vector, and supplies the differential vector to the terminal 15.

Figure 6:
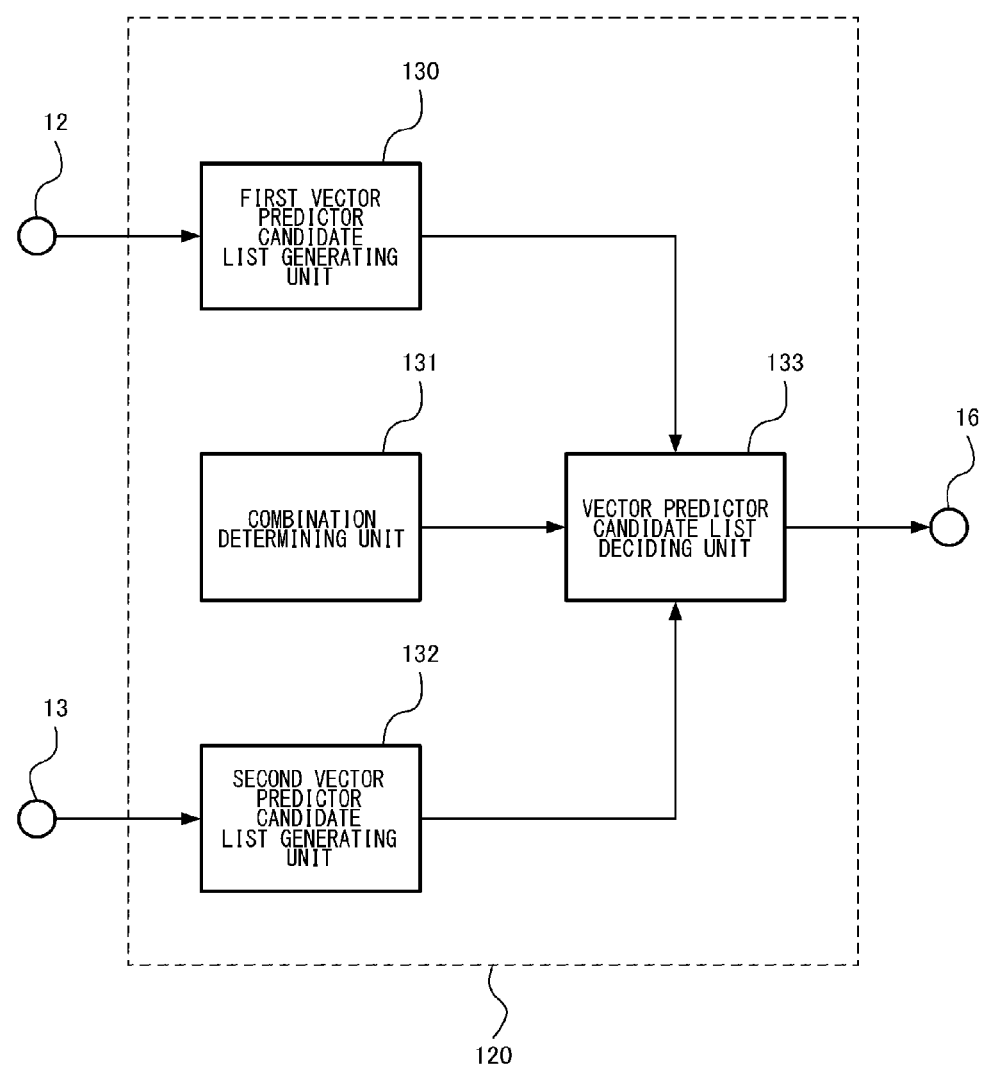
FIG. 6 is a diagram for explaining a structure of a vector predictor candidate list generating unit of FIG. 3.

FIG. 6 illustrates a structure of the vector predictor candidate list generating unit 120.

The vector predictor candidate list generating unit 120 includes a first vector predictor candidate list generating unit 130, a combination determining unit 131, a second vector predictor candidate list generating unit 132, and a vector predictor candidate list deciding unit 133. A terminal 16 is connected to the vector predictor selecting unit 121.

The functions of the respective units will be described below.

The first vector predictor candidate list generating unit 130 generates a first vector predictor candidate list containing one or more motion vectors from the first group of candidate blocks supplied from the terminal 12, and supplies the first vector predictor candidate list to the vector predictor candidate list deciding unit 133.

The combination determining unit 131 derives a combination determination result from the predictive block size of the predictive blocks to be processed, and supplies the combination determination result to the vector predictor candidate list deciding unit 133.

The second vector predictor candidate list generating unit 132 generates a second vector predictor candidate list containing zero or more motion vectors from the second group of candidate blocks supplied from the terminal 13, and supplies the second vector predictor candidate list to the vector predictor candidate list deciding unit 133.

The vector predictor candidate list deciding unit 133 decides a third vector predictor candidate list from the first vector predictor candidate list supplied from the first vector predictor candidate list generating unit 130 and the second vector predictor candidate list supplied from the second vector predictor candidate list generating unit 132 on the basis of the combination determination result supplied from the combination determining unit 131, and supplies the third vector predictor candidate list to the terminal 16.

(Operations of Moving Picture Encoding Device 100)

Figure 7:
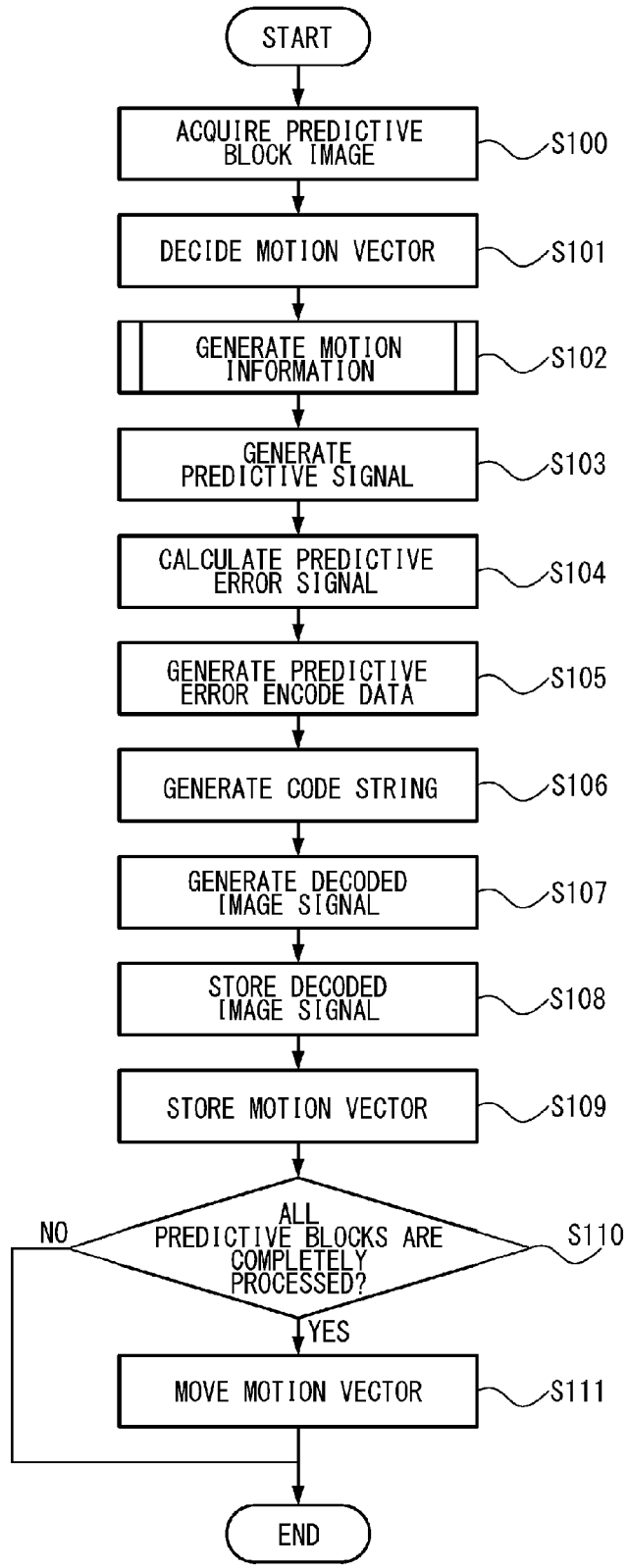
FIG. 7 is a flowchart for explaining the operations of the moving picture encoding device according to the first embodiment.

Subsequently, the encoding operations of the moving picture encoding device 100 according to the present embodiment will be described with reference to the flowchart of FIG. 7.

The predictive block image acquiring unit 101 acquires an image signal of predictive blocks to be processed from the image signals supplied from the terminal 10 on the basis of the position information on the predictive blocks and the predictive block size (step S100).

The motion vector detecting unit 108 detects a motion vector from the image signal supplied from the predictive block image acquiring unit 101 and the reference image signal supplied from the frame memory 110 (step S101).

The motion information generating unit 109 generates a differential vector and a vector predictor index from the motion vector supplied from the motion vector detecting unit 108, the first group of candidate blocks supplied form the first motion information memory 111, and the second group of candidate blocks supplied from the second motion information memory 112 (step S102).

The motion compensating unit 106 motion compensates the reference image in the frame memory 110 based on the motion vector supplied from the motion vector detecting unit 108 to generate a predictive signal (step S103).

The subtracting unit 102 subtracts the predictive signal supplied from the predictive block image acquiring unit 101 and a predictive signal supplied from the motion compensating unit 106 to calculate a predictive error signal (step S104).

The predictive error encoding unit 103 performs the processes such as quantization and orthogonal transform on the predictive error signal supplied from the subtracting unit 102 to generate predictive error encode data (step S105).

The code string generating unit 104 entropy-encodes the predictive error encode data supplied form the predictive error encoding unit 103 as well as the differential vector and the vector predictor index supplied from the motion information generating unit 109 according to syntax together with the motion compensating prediction direction and the reference index, to generate a code string (step S106).

The adding unit 107 adds the predictive error signal supplied from the predictive error decoding unit 105 and the predictive signal supplied from the motion compensating unit 106 to generate a decoded image signal (step S107).

The frame memory 110 stores the decoded image signal supplied from the adding unit 107 (step S108).

The first motion information memory 111 stores the motion vectors supplied from the motion vector detecting unit 108 for one image in units of minimum predictive block size (step S109).

When the entire image is completely processed (YES in step S110), a first motion information memory 207 moves the motion vectors for one screen stored in a second motion information memory 208, and the second motion information memory 112 stores the motion vectors supplied from the first motion information memory 111 for a predetermined number of images (step S111). In the present embodiment, step S111 is performed when the entire image is completely processed, but may be performed per predictive blocks to be processed.

Figure 8:
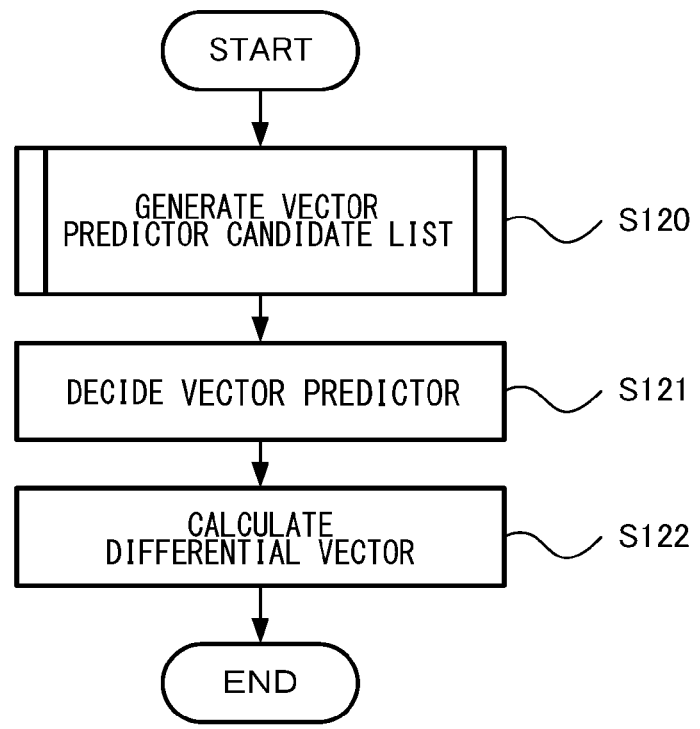
FIG. 8 is a flowchart for explaining the operations of the motion information generating unit of FIG. 1.

Subsequently, the operations of the motion information generating unit 109 will be described with reference to the flowchart of FIG. 8.

The vector predictor candidate list generating unit 120 generates a vector predictor candidate list from the first group of candidate blocks supplied from the terminal 12 and the second group of candidate blocks supplied from the terminal 13 (step S120).

The vector predictor selecting unit 121 decides a vector predictor corresponding to the motion vector supplied from the terminal 14 from the vector predictor candidate list supplied from the vector predictor candidate list generating unit 120 (step S121). A vector predictor deciding method will be described herein. A sum of absolute differences of the horizontal components and the vertical components of a motion vector and each vector predictor candidate contained in the vector predictor candidate list is found, and a vector predictor candidate with the minimum sum of absolute differences is decided as a vector predictor. This is because a minimum amount of codes of the encode vector can be expected. Any method with a minimum amount of codes of an encode vector may be employed, and is not limited to the method.

The subtracting unit 122 subtracts the vector predictor supplied from the vector predictor selecting unit 121 from the motion vector supplied from the terminal 14 to calculate a differential vector (step S122).

Figure 9:
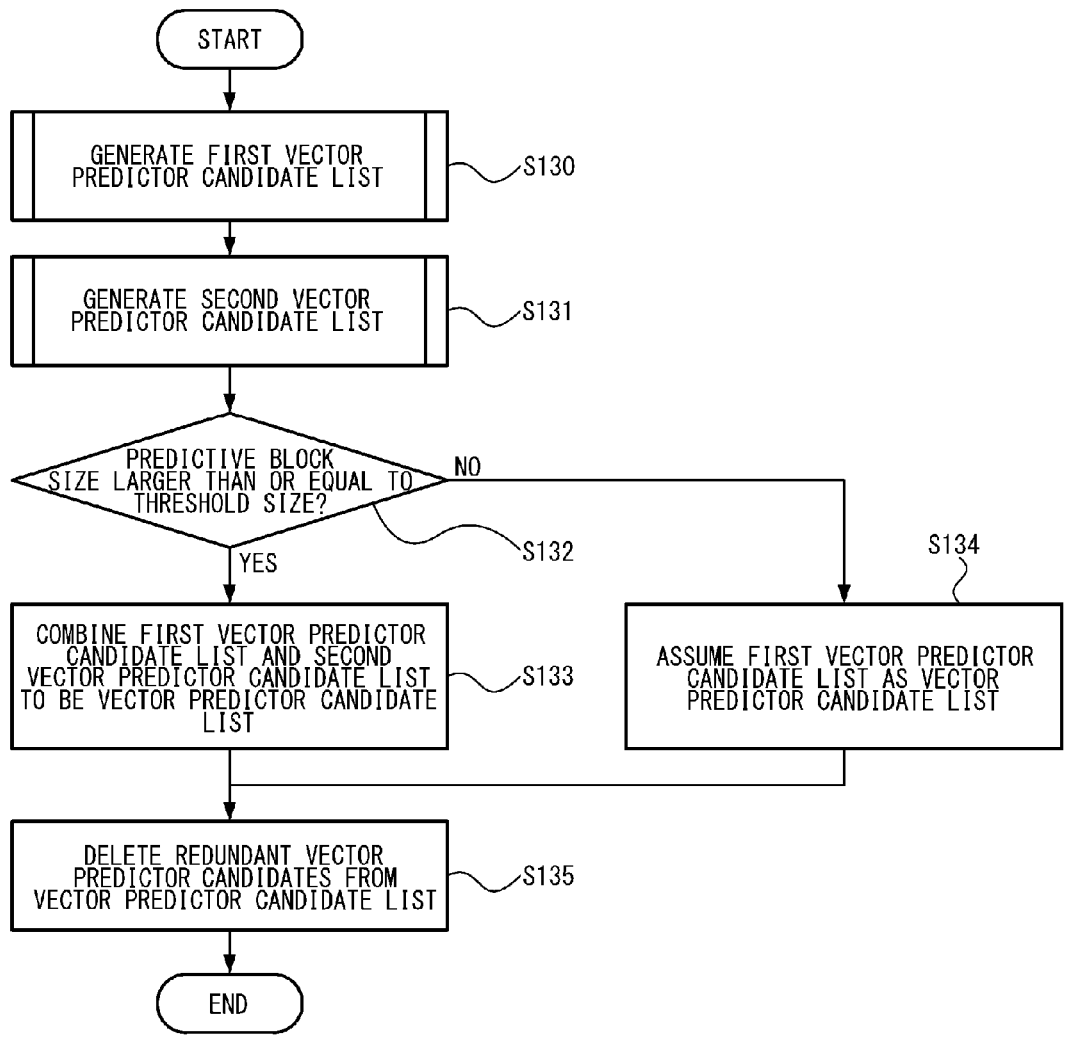
FIG. 9 is a flowchart for explaining the operations of the vector predictor candidate list generating unit of FIG. 6.

Subsequently, the operations of the vector predictor candidate list generating unit 120 will be described with reference to the flowchart of FIG. 9.

The first vector predictor candidate list generating unit 130 generates a first vector predictor candidate list containing one or more motion vectors from the first group of candidate blocks supplied from the terminal 12 (step S130).

The second vector predictor candidate list generating unit 132 generates a second vector predictor candidate list containing zero or more motion vectors from the second group of candidate blocks supplied from the terminal 13 (step S131).

The combination determining unit 131 derives a combination determination result from a predictive block size of the predictive blocks to be processed, and a predetermined threshold size (step S132).

The combination determination result is derived by comparing the predictive block size of the blocks to be processed with the predetermined threshold size. When the predictive block size of the blocks to be processed is larger than or equal to the predetermined threshold size, the combination determination result is set to 1, and otherwise, is set to 0. The combination determination according to the present embodiment is made by comparing the predictive block size of the blocks to be processed with the predetermined threshold size, and thus when the predictive block size of the blocks to be processed is larger than the predetermined threshold size, the combination determination result may be set to 1, and otherwise, may be set to 0.

In the present embodiment, the predetermined threshold size is set at 16 pixels×16 pixels which is ¼ of the maximum predictive block size. The predetermined threshold size is not limited thereto, and may be set by constraints on hardware.

When the combination determination result supplied from the combination determining unit 131 is 1 (YES in step S132), the vector predictor candidate list deciding unit 133 combines the first vector predictor candidate list supplied from the first vector predictor candidate list generating unit 130 and the second vector predictor candidate list supplied from the second vector predictor candidate list generating unit 132 to be a vector predictor candidate list (step S133).

When the combination determination result supplied from the combination determining unit 131 is 0 (NO in step S132), the vector predictor candidate list deciding unit 133 assumes the first vector predictor candidate list supplied from the first vector predictor candidate list generating unit 130 as a vector predictor candidate list (step S134). That is, when the combination determination result supplied from the combination determining unit 131 is 0, the vector predictor candidates contained in the second vector predictor candidate list supplied from the second vector predictor candidate list generating unit 132 are not contained in the vector predictor candidate list.

The vector predictor candidate list deciding unit 133 sequentially examines the vector predictor candidates contained in the vector predictor candidate list to detect the same motion vectors, deletes the vector predictor candidates detected as being identical from the vector predictor candidate list to prevent being overlapped vector predictor candidates, and updates the vector predictor candidate list and deletes the redundant vector predictor candidates (step S135).

In the present embodiment, step S135 is performed in order to enhance the vector predictor index encoding accuracy, but step S135 may be omitted.

Step S131 is performed prior to step S132 in the present embodiment in order to facilitate the description, but step S132 may be performed first, and step S131 may be omitted when the combination determination result is 0.

Figure 10:
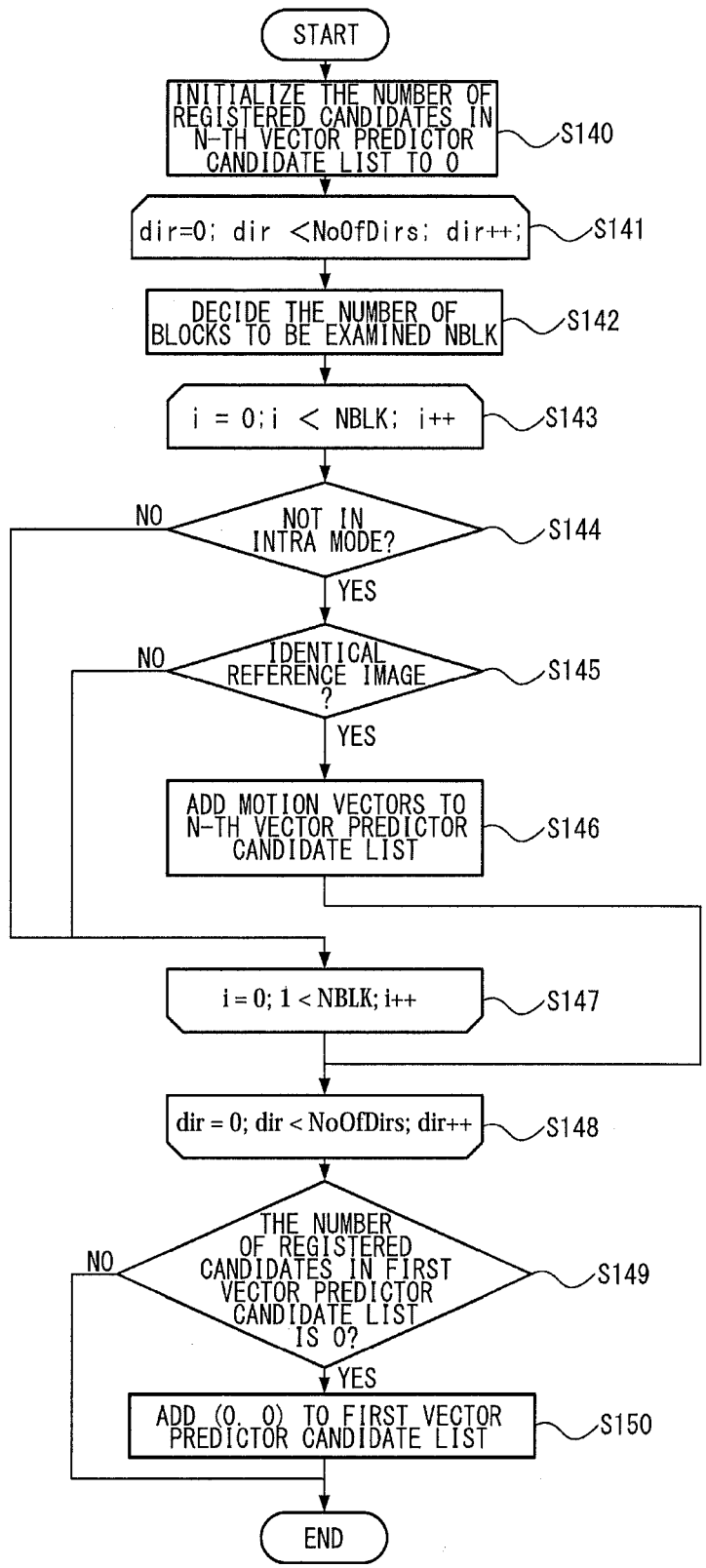
FIG. 10 is a flowchart for explaining the operations of a first vector predictor candidate list generating unit and a second vector predictor candidate list generating unit of FIG. 6.

Subsequently, the operations of the first vector predictor candidate list generating unit 130 will be described with reference to the flowchart of FIG. 10. The N-th in FIG. 10 is the first.

At first, the first vector predictor candidate list is initialized assuming the number of registered candidates in the first vector predictor candidate list as 0 (step S140).

Then, the horizontal direction (direction 1) and the vertical direction (direction 2) are defined as the examination directions for the first group of candidate blocks, and the following processes will be performed (step S141). Examination in each direction for the first group of candidate blocks will be described with reference to FIG. 11.

The examination in the horizontal direction is sequentially made from the block C through block B1, block B2, block B3 and block B4 up to block D. The examination in the vertical direction is sequentially made from block E through block A1, block A2 and block A3 up to block A4.

The number of candidates to be examined, which are examined as to whether to be added to the first vector predictor candidate list, is decided (step S142).

In the present embodiment, the maximum number of blocks to be examined in the horizontal direction is assumed as 10 including eight blocks which are half the maximum predictive block size, and block C and block D, and the maximum number of blocks to be examined in the vertical direction is assumed as 9 including eight blocks which are half the maximum predictive block size, and block E. The block C, the block D and the block E may not be present depending on the positions of the predictive blocks to be processed. When the block C, the block D and the block E are not present, the number of absent blocks is subtracted from the maximum number of blocks to be examined. Then, if the number of candidate blocks in each direction contained in the first group of candidate blocks exceeds the maximum number of blocks to be examined, the number of blocks to be examined is limited to the maximum number.

Then, the following processes are repeatedly performed for the candidate blocks to be examined in each direction which are contained in the first group of candidate blocks (step S143).

A determination is made as to whether the reference index of the candidate block is not −1, that is, it is not in the intra mode (step S144).

When the candidate block is not in the intra mode (YES in step S114), a determination is made as to whether the reference index of the candidate block is the same as the reference image index of the predictive blocks to be processed (step S145).

When the reference index of the candidate block is the same as the reference image index of the predictive blocks to be processed (YES in step S145), the motion vector of the candidate block is added to the first vector predictor candidate list (step S146).

When the reference index of the candidate block is −1 (NO in step S144) or when the reference index of the candidate block is not the same as the reference image index of the predictive blocks to be processed (NO in step S145), a next candidate block is examined (step S147).

When the reference index of the candidate block is the same as the reference image index of the predictive blocks to be processed or until the blocks to be examined in each direction are processed, the above processes are repeated (step S148).

Then, whether the number of registered candidates in the first vector predictor candidate list is 0 is examined (step S149).

When the number of registered candidates in the first vector predictor candidate list is 0 (YES in step S149), the motion vector (0, 0) is added to the first vector predictor candidate list (step S150), and the process is terminated.

When the number of registered candidates in the first vector predictor candidate list is not 0 (NO in step S149), the process is terminated. A motion vector to be added to the first vector predictor candidate list is derived as described above.

Subsequently, the operations of the second vector predictor candidate list generating unit 132 will be described with reference to the flowchart of FIG. 10. The N-th in FIG. 10 is the second.

Figure 12:
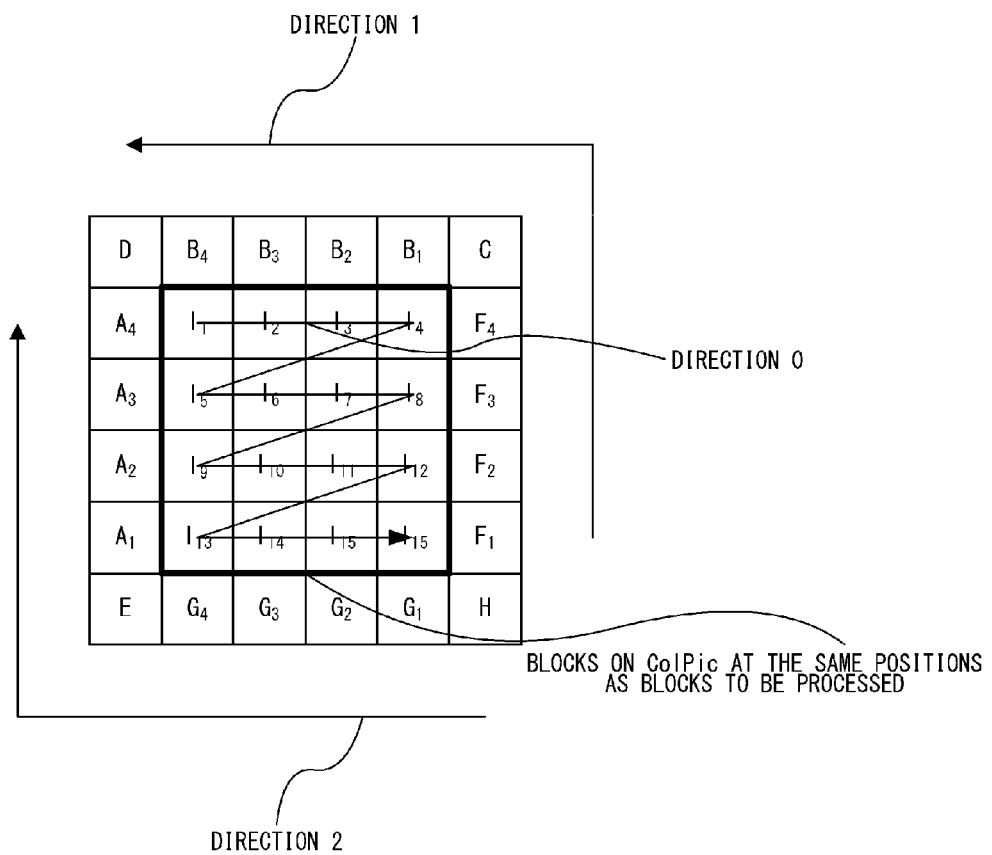
FIG. 12 is a diagram for explaining an examination in each direction for the second group of candidate blocks.

An examination order in each direction for the second group of candidate blocks is illustrated in FIG. 12.

A first difference from the operations of the first vector predictor candidate list generating unit 130 is to have the same position direction (direction 0) as an examination direction, where the examination is made in order of the same position direction, the horizontal direction and the vertical direction. The candidate blocks in the same position direction correspond to I1 to I16 in FIG. 12, and the examination in the same position direction is made in the raster scan order.

A second difference from the operations of the first vector predictor candidate list generating unit 130 is that step S149 and step S150 are not performed. The steps are performed for adding one or more vector predictor candidates to either the first vector predictor candidate list or the second vector predictor candidate list, or to the vector predictor candidate list, and thus the steps may be performed in any of the first vector predictor candidate list generating unit 130 or the second vector predictor candidate list generating unit 132, or may be performed in the vector predictor list deciding unit 133.

In the present embodiment, the maximum number of blocks to be examined is limited to 9 in order to reduce the amount of memory accesses, but a limitation may not be particularly imposed.

In the present embodiment, the processing speed takes priority, and when the reference index of the candidate block is the same as the reference image index of the predictive blocks to be processed in step S146, the examination is made in a next direction, but the examination may be repeated for the blocks to be examined in each direction.

Figure 11:
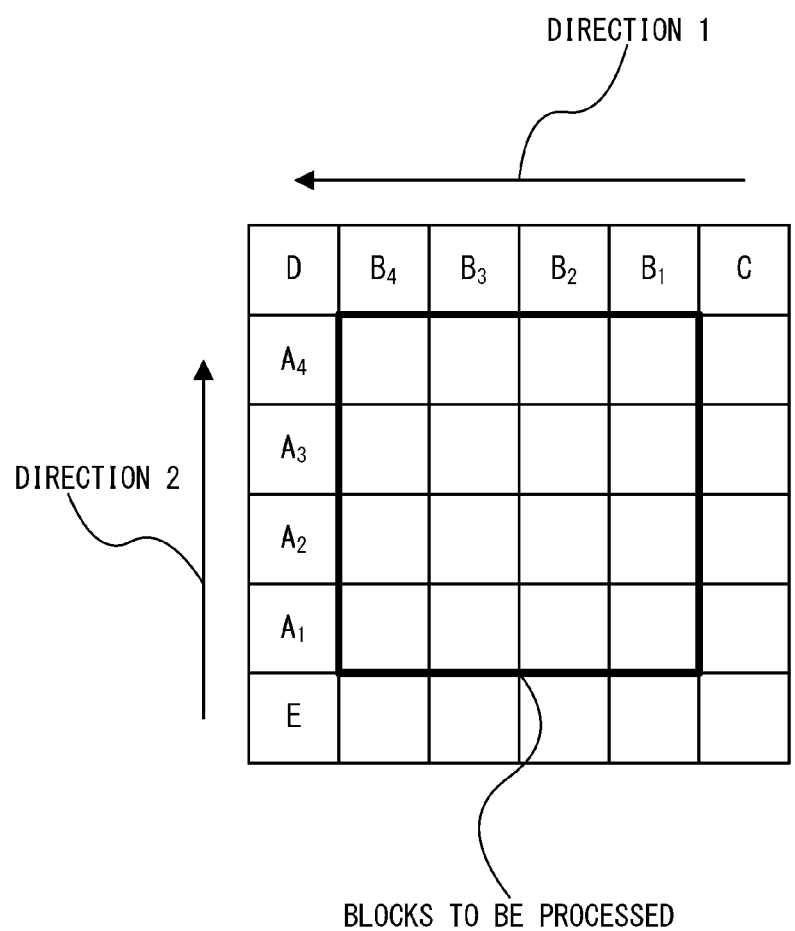
FIG. 11 is a diagram for explaining an examination in each direction for the first group of candidate blocks.

In the present embodiment, the examining method in each direction for the first group of candidate blocks is assumed as in FIG. 11, but the total number of blocks to be examined in all the directions may be one or more, and the method is not limited to the examining method. For example, the direction 1 may include block C, block B1 and block D, and the direction 2 may include only block E and block A1.

In the present embodiment, the examining method in each direction for the second group of candidate blocks is assumed as in FIG. 12, but the total number of blocks to be examined in all the directions may by one or more, and the method is not limited to the examining method. For example, the direction 2 may include only block H, or two blocks of block H and block I.

(Structure of Moving Picture Decoding Device 200)

Figure 13:
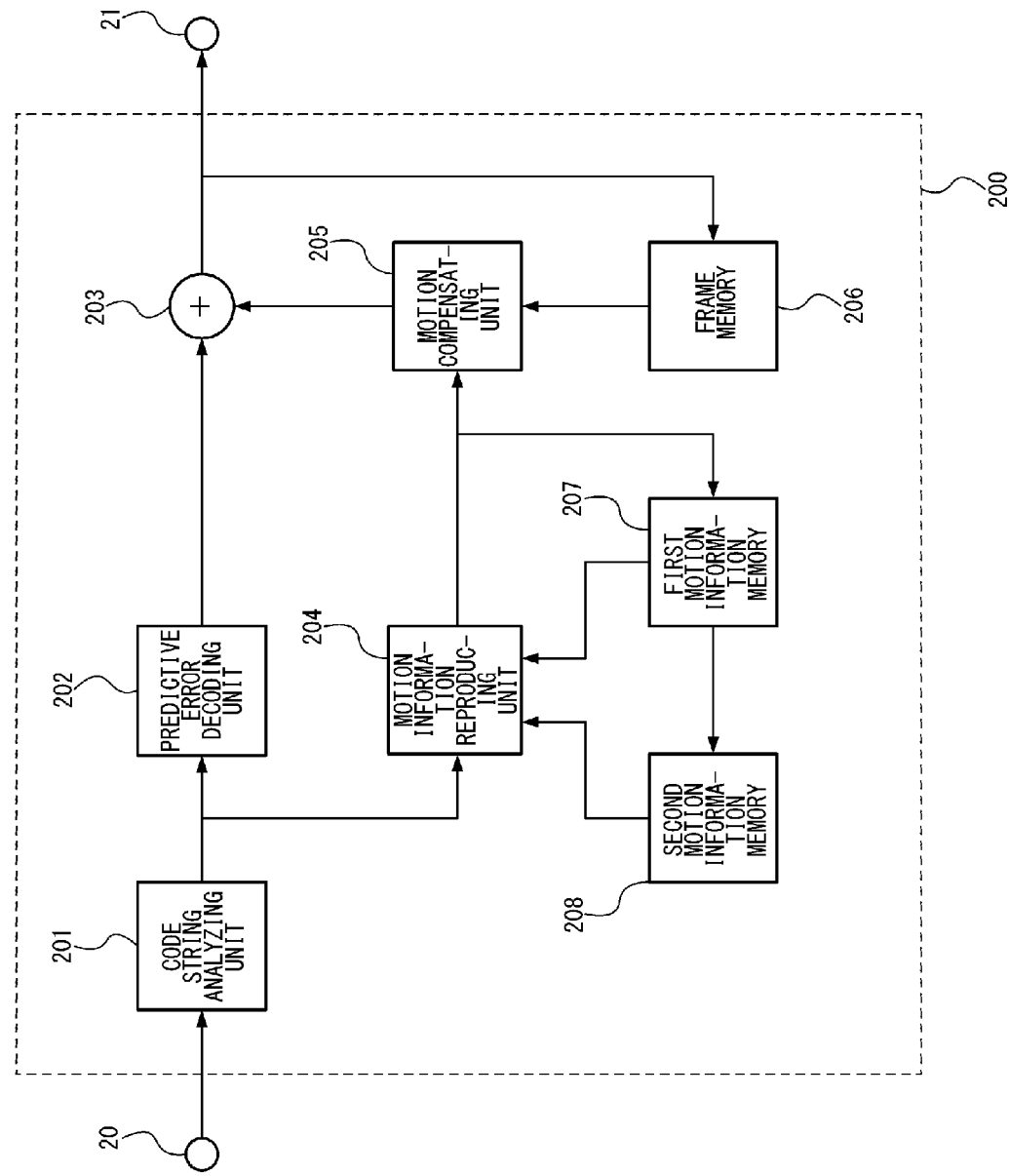
FIG. 13 is a diagram for explaining a moving picture decoding device according to the first embodiment.

A moving picture decoding device according to the present embodiment will be described below. FIG. 13 illustrates a moving picture decoding device 200 according to the present embodiment. The moving picture decoding device 200 is directed for decoding a code string encoded by the moving picture encoding device 100 to generate a reproduced image.

The moving picture decoding device 200 is accomplished in hardware such as an information processing device including a Central Processing Unit (CPU), a frame memory and a hard disk. The above components operate so that the moving picture decoding device 200 accomplishes the functional components described later.

It is assumed that position information on predictive blocks to be decoded, a predictive block size, reference image indexes, and a motion compensating prediction direction are shared in the moving picture decoding device 200, which will not be illustrated.

The moving picture decoding device 200 according to the present embodiment is configured of a code string analyzing unit 201, a predictive error decoding unit 202, an adding unit 203, a motion information reproducing unit 204, a motion compensating unit 205, a frame memory 206, the first motion information memory 207 and the second motion information memory 208.

(Functions of Moving Picture Decoding Device 200)

The functions of the respective units will be described below.

The code string analyzing unit 201 decodes a code string supplied from a terminal 20, decodes predictive error encode data, a motion compensating prediction direction, a reference image index, a differential vector and a vector predictor index according to syntax, and supplies the predictive error encode data to the predictive error decoding unit 202, and the differential vector and the vector predictor index to the motion information reproducing unit 204.

The predictive error decoding unit 202 performs the processes such as inverse quantization and inverse orthogonal transform on the predictive error encode data supplied from the code string analyzing unit 201 to generate a predictive error signal, and supplies the predictive error signal to the adding unit 203.

The adding unit 203 adds the predictive error signal supplied from the predictive error decoding unit 202 and the predictive signal supplied from the motion compensating unit 205 to generate a decoded image signal, and supplies the decoded image signal to the frame memory 206.

The motion information reproducing unit 204 reproduces a motion vector from the differential vector and the vector predictor index supplied from the code string analyzing unit 201, the first group of candidate blocks supplied from the first motion information memory 207, and the second group of candidate blocks supplied from the second motion information memory 208, and supplies the motion vector to the motion compensating unit 205.

A detailed structure of the motion information reproducing unit 204 will be described later.

The motion compensating unit 205 motion compensates a reference image in the frame memory 206 by the motion vector supplied from the motion information reproducing unit 204 to generate a predictive signal. When the motion compensating prediction direction is bidirectional, the predictive signals in both the directions are averaged to be a predictive signal, and the predictive signal is supplied to the adding unit 203.

The frame memory 206, the first motion information memory 207 and the second motion information memory 208 have the same functions as the frame memory 110, the first motion information memory 111 and the second motion information memory 112, respectively.

Figure 14:
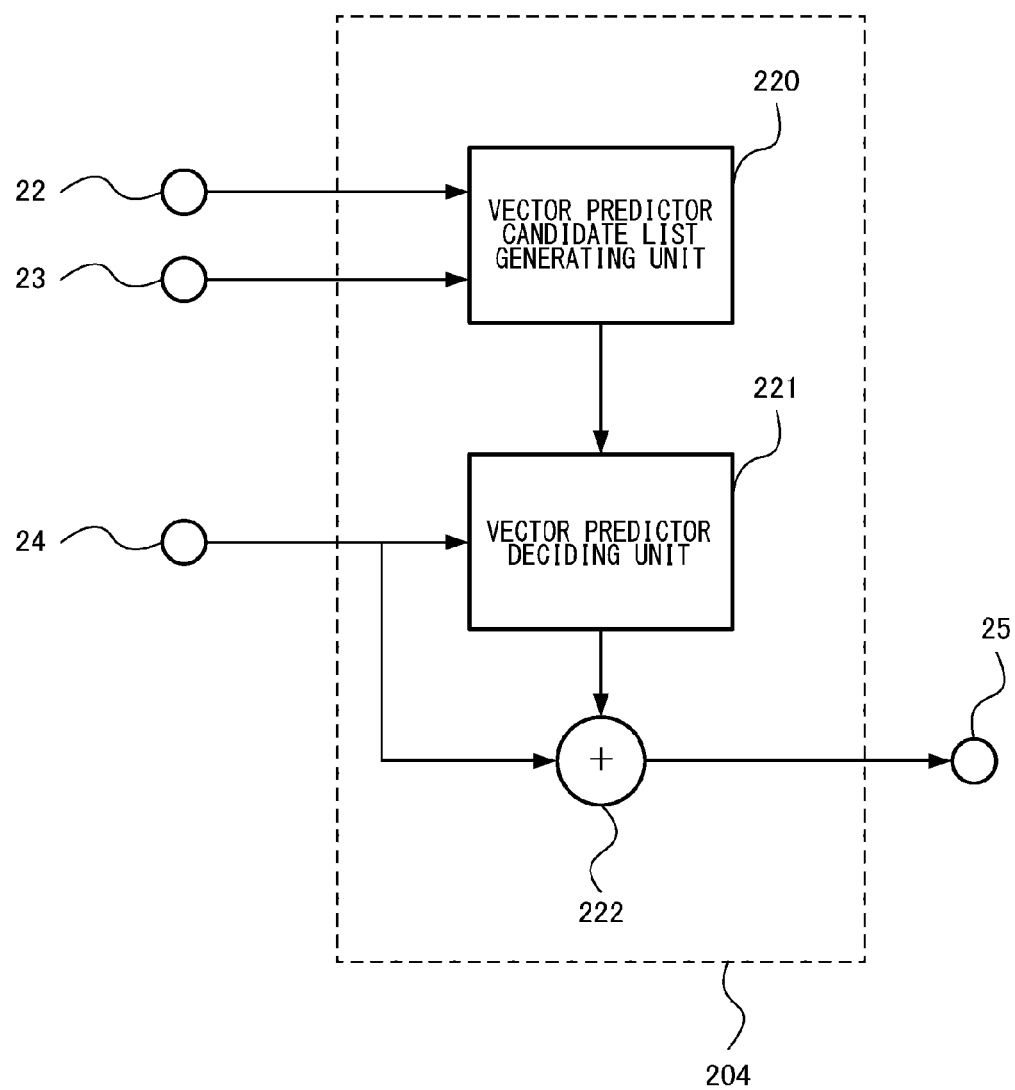
FIG. 14 is a diagram for explaining a structure of a motion information reproducing unit of FIG. 13.

Subsequently, a detailed structure of the motion information reproducing unit 204 characteristic of the present embodiment will be described with reference to FIG. 14. FIG. 14 illustrates a structure of the motion information reproducing unit 204.

The motion information reproducing unit 204 includes a vector predictor candidate list generating unit 220, a vector predictor deciding unit 221, and an adding unit 222. A terminal 22, a terminal 23, a terminal 24, and a terminal 25 are connected to the first motion information memory 207, the second motion information memory 208, the code string analyzing unit 201 and the motion compensating unit 205, respectively.

The functions of the respective units will be described below.

The vector predictor candidate list generating unit 220 has the same function as the vector predictor candidate list generating unit 120.

The vector predictor deciding unit 221 decides a vector predictor from a vector predictor candidate list supplied from the vector predictor candidate list generating unit 220 and vector predictor index supplied from the terminal 24, and supplies the vector predictor to the adding unit 222.

The adding unit 222 adds the differential vector supplied from the terminal 24 and the vector predictor supplied from the vector predictor deciding unit 221 to calculate a motion vector, and supplies the motion vector to the terminal 25.

(Operations of Decoding Device)

Figure 15:
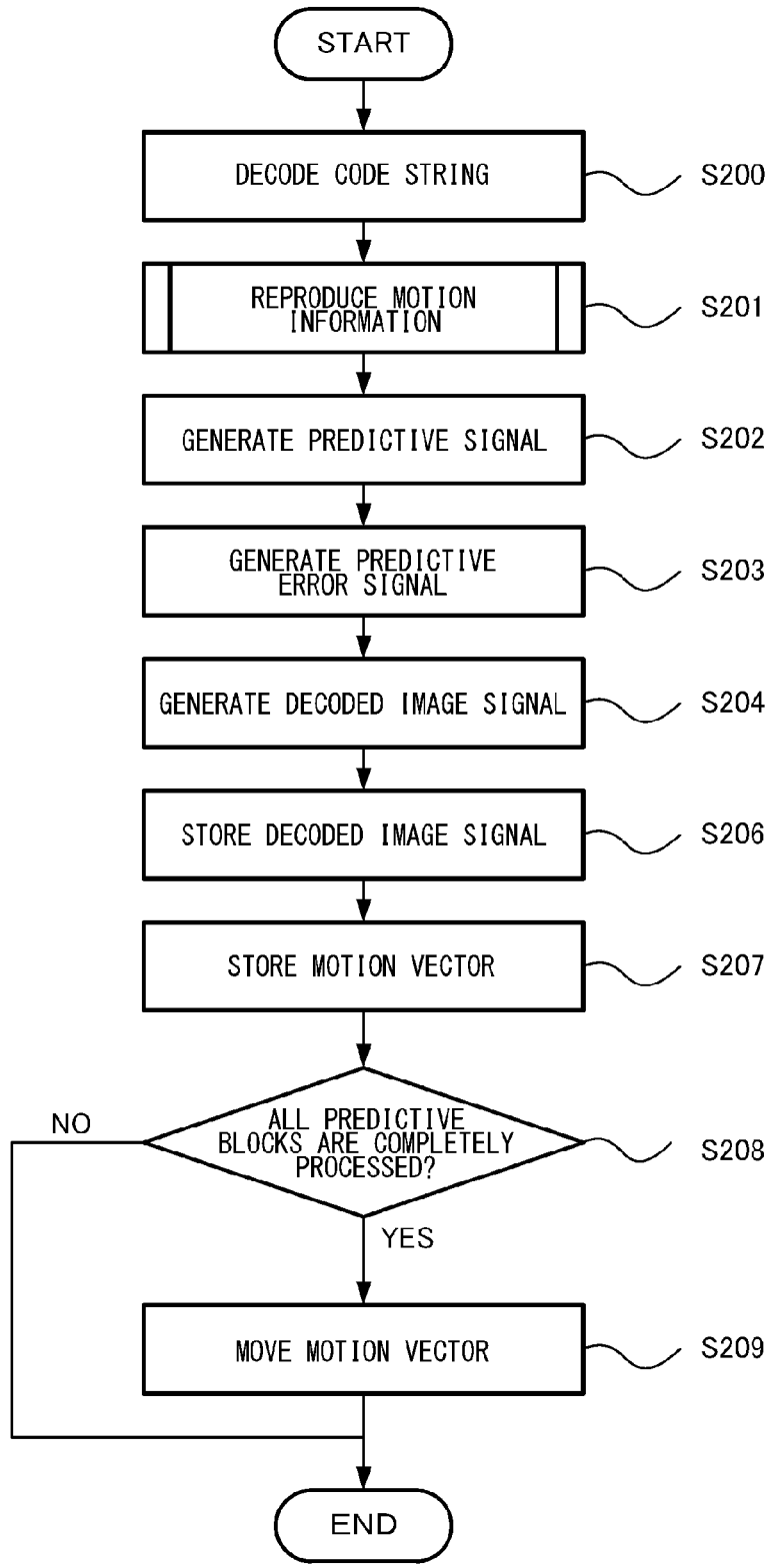
FIG. 15 is a flowchart for explaining the decoding operations of the moving picture decoding device according to the first embodiment.

Subsequently, the decoding operations in the moving picture decoding device 200 according to the present embodiment will be described with reference to the flowchart of FIG. 15.

The code string analyzing unit 201 decodes the code string supplied form the terminal 20, and decodes the predictive error encode data, the motion compensating prediction direction, the reference image index, the differential vector and the vector predictor index according to syntax (step S200).

The motion information reproducing unit 204 reproduces a motion vector from the differential vector and the vector predictor index supplied from the code string analyzing unit 201, the first group of candidate blocks supplied from the first motion information memory 207, and the second group of candidate blocks supplied from the second motion information memory 208 (step S201).

The motion compensating unit 205 motion compensates a reference image in the frame memory 206 based on the motion vector supplied from the motion information reproducing unit 204 to generate a predictive signal (step S202).

The predictive error decoding unit 202 performs the processes such as inverse quantization and inverse orthogonal transform on the predictive error encode data supplied from the code string analyzing unit 201 to generate a predictive error signal (step S203).

The adding unit 203 adds the predictive error signal supplied from the predictive error decoding unit 202 and the predictive signal supplied from the motion compensating unit 205 to generate a decoded image signal (step S204).

The frame memory 206 stores the decoded image signal supplied from the adding unit 203 (step S206).

The first motion information memory 207 stores the motion vectors supplied from the motion information reproducing unit 204 for one image in units of minimum predictive block size (step s207).

When the entire image is completely processed (YES in step S208), the first motion information memory 207 moves the stored motion vectors for one image to the second motion information memory 208, and the second motion information memory 208 stores the motion vectors supplied from the first motion information memory 207 for a predetermined number of images (step S209).

Figure 16:
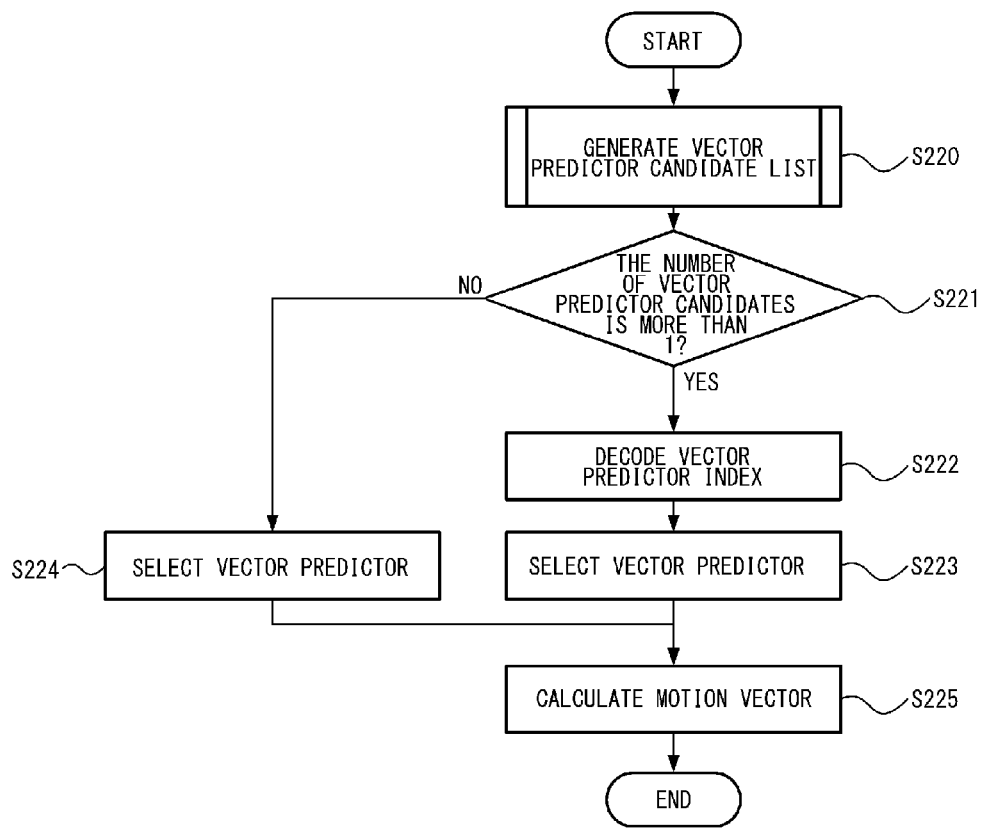
FIG. 16 is a flowchart for explaining the operations of the motion information reproducing unit of FIG. 14.

Subsequently, the operations of the motion information reproducing unit 204 will be described with reference to the flowchart of FIG. 16.

The vector predictor candidate list generating unit 220 generates a vector predictor candidate list from the first group of candidate blocks supplied from the terminal 22 and the second group of candidate blocks supplied from the terminal 23 (step S220).

The vector predictor deciding unit 221 determines whether the number of vector predictor candidates in the vector predictor candidate list supplied from the vector predictor candidate list generating unit 220 is more than 1 (step S221).

When the number of vector predictor candidates is more than 1 (YES in step S221), the vector predictor deciding unit 221 acquires the vector predictor index supplied from the code string analyzing unit 201 (step S222). Then, it selects the vector predictor candidates indicated by the vector predictor index as vector predictor from the vector predictor candidate list (step S223).

When the number of vector predictor candidates is 1 (NO in step S221), the vector predictor deciding unit 221 selects the only one vector predictor candidate contained in the vector predictor candidate list as a vector predictor (step S224).

The adding unit 222 adds the differential vector supplied from the terminal 24 and the vector predictor supplied from the vector predictor deciding unit 221 to calculate a motion vector (step S225).

(Extended Example of First Embodiment)

The present embodiment can be extended as follows.

(Predetermined Threshold Size)

The predetermined threshold size is set at 16 pixels×16 pixels which is ¼ of the maximum predictive block size according to the present embodiment, but if the predetermined threshold size is between the minimum predictive block size and the maximum predictive block size, asymmetrical blocks such as 32×16 or 4×8 may be employed, for example. When the predetermined threshold size is the maximum predictive block size, the combination determination result may be 0 for all the predictive block sizes. In this case, since the combination determination result is 0 for all the predictive block sizes, the motion vector on ColPic contained in the second vector predictor candidate list is not finally used as a vector predictor.

The predetermined threshold size is previously defined in the present embodiment, but the predetermined threshold size may be adaptively set by being encoded into and decoded from a code string depending on the property of the moving picture in the encoding device. For example, the predetermined threshold size may be adaptively set to be larger as the screen size is larger or to be larger as the motion is larger.

It is assumed herein that the predetermined threshold size is encoded into and decoded from a code string, but the predetermined threshold size has only to be shared between the encoding side and the decoding size, and is not limited to the above. For example, there can be realized that a flag indicating a fixed predetermined threshold size (such as 4×4 or 8×8) is encoded into and decoded from a code string, the fixed predetermined threshold size is set when the flag indicating the predetermined threshold size is 0 and the predetermined threshold size is not set when the flag indicating the predetermined threshold size is 1 on the encoding side and the decoding side. There may be configured such that when the predetermined threshold size is not set, the first vector predictor candidate list and the second vector predictor candidate list are combined to generate a vector predictor candidate list.

The predetermined threshold size is set at the maximum predictive block size and is adaptively set depending on the property of the moving picture assuming that information (which will be denoted temporal candidate using flag) indicating that the predetermined threshold size is the maximum predictive block size is encoded into and decoded from a code string per sequence or per picture, the motion vector on ColPic contained in the second vector predictor candidate list is not used as a vector predictor on the encoding side and the decoding side when the temporal candidate using flag is 0, and the motion vector on ColPic contained in the second vector predictor candidate list is used as a vector predictor on the encoding side and the decoding side when the temporal candidate using flag is 1.

When a transmission error easily occurs as in wireless transmission, the predetermined threshold size is set at the maximum predictive block size and the motion vector on ColPic contained in the second vector predictor candidate list is not used as a vector predictor at any time so that the motion vector predictor can be acquired even when ColPic is lost, thereby preventing a serious error that an encode stream cannot be decoded.

(Distance Dependence)

The predetermined threshold size is previously defined in the present embodiment, but the predetermined threshold size may be controlled to be larger as a distance between images is longer depending on the distance (temporal difference) between the image to be processed in which the predictive blocks to be processed are present and the different decoded image in which the second group of candidate blocks is present. This is performed because the motion information between the images is less correlated as the distance between the images is longer.

Figure 17:
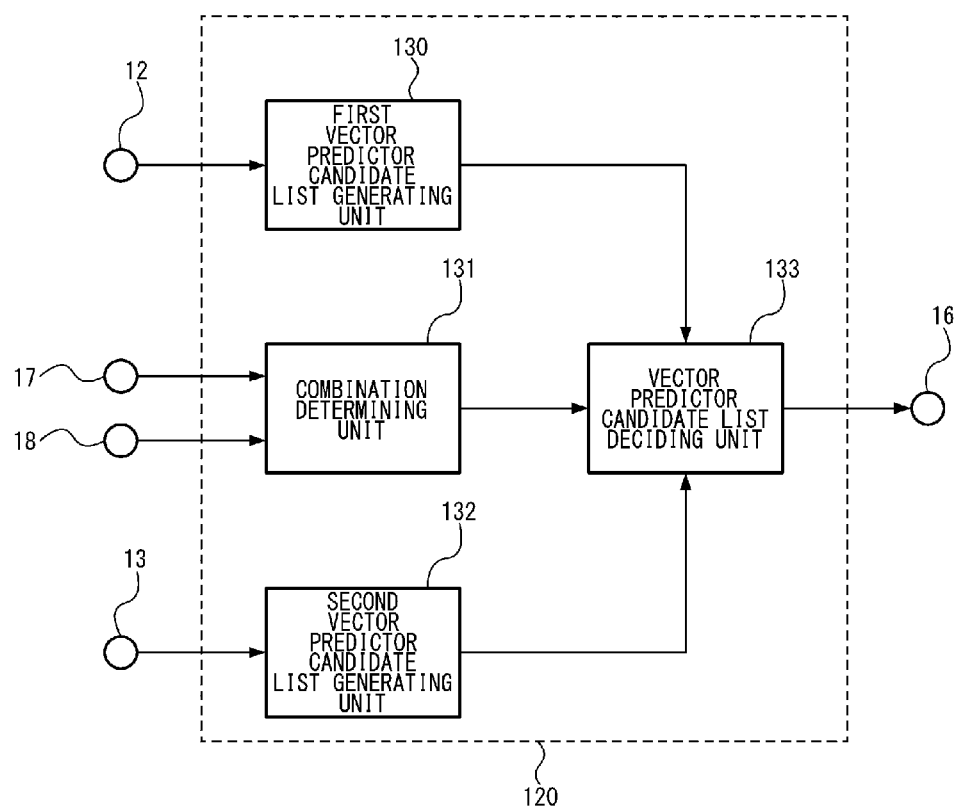
FIG. 17 is a diagram for explaining a structure of a vector predictor candidate list generating unit according to an extended example of the first embodiment.
Figure 18:
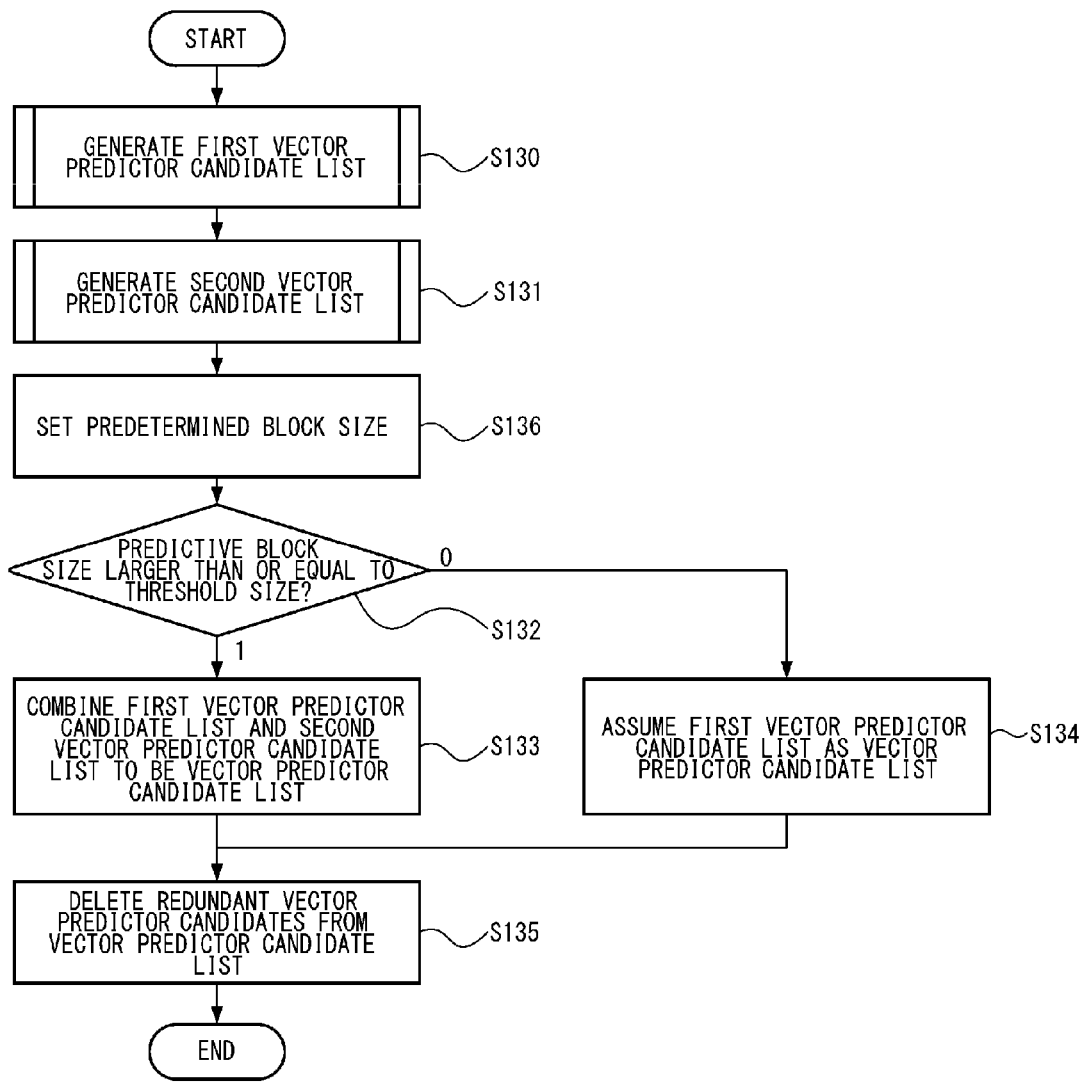
FIG. 18 is a flowchart for explaining the operations of the vector predictor candidate list generating unit according to the extended example of the first embodiment.

The structure and operations of the vector predictor candidate list generating unit 120 in this case will be described in FIG. 17 and FIG. 18, respectively. In the vector predictor candidate list generating unit 120 according to the extended example of the present embodiment, a terminal 17 and a terminal 18 are connected to the combination determining unit 131. Temporal information on an image to be processed is supplied from the terminal 17 and temporal information on a different decoded image is supplied from the terminal 18. The combination determining unit 131 sets the predetermined threshold size to be larger as the distance between the images is longer by the temporal information on the image to be processed supplied from the terminal 17 and the temporal information on the different decoded image supplied from the terminal 18 (step S136). In the present example, POC is used as the temporal information. FIG. 19 illustrates an example in which the predetermined threshold size is controlled to be larger than a POC difference is larger. When the POC difference is larger than or equal to a predetermined value, the predetermined threshold size may always function as the maximum predictive block size.

(Priority of Vector Predictors)

In the present embodiment, it is assumed that when the combination determination result is 1, the first vector predictor candidate list and the second vector predictor candidate list are combined to generate a vector predictor candidate list. Typically, when the neighboring area containing the predictive block size to be processed moves in parallel or is still, or when the predictive block size to be processed is large, the motion vector of the different image from the predictive blocks to be processed is valid, and thus the second vector predictor candidate list takes priority, and then the first vector predictor candidate list can be added. The index of a vector predictor with a higher priority in the vector predictor candidate list combining the first vector predictor candidate list and the second vector predictor candidate list is allocated with a code having a shorter code length and is encoded, thereby enhancing the index encode efficiency.

In the present embodiment, it is assumed that when the combination determination result is 1, the first vector predictor candidate list and the second vector predictor candidate list are combined to generate a vector predictor candidate list, and when the combination determination result is 0, a vector predictor candidate list is generated from the first vector predictor candidate list. According to the present embodiment, when the blocks to be processed are larger than or equal to the predetermined threshold size, the motion vector of the different decoded image may take priority, when the combination determination result is 1, the second vector predictor candidate list and the first vector predictor candidate list may be sequentially combined to generate a vector predictor candidate list, and when the combination determination result is 0, the first vector predictor candidate list and the second vector predictor candidate list may be sequentially combined to generate a vector predictor candidate list.

Figure 20:
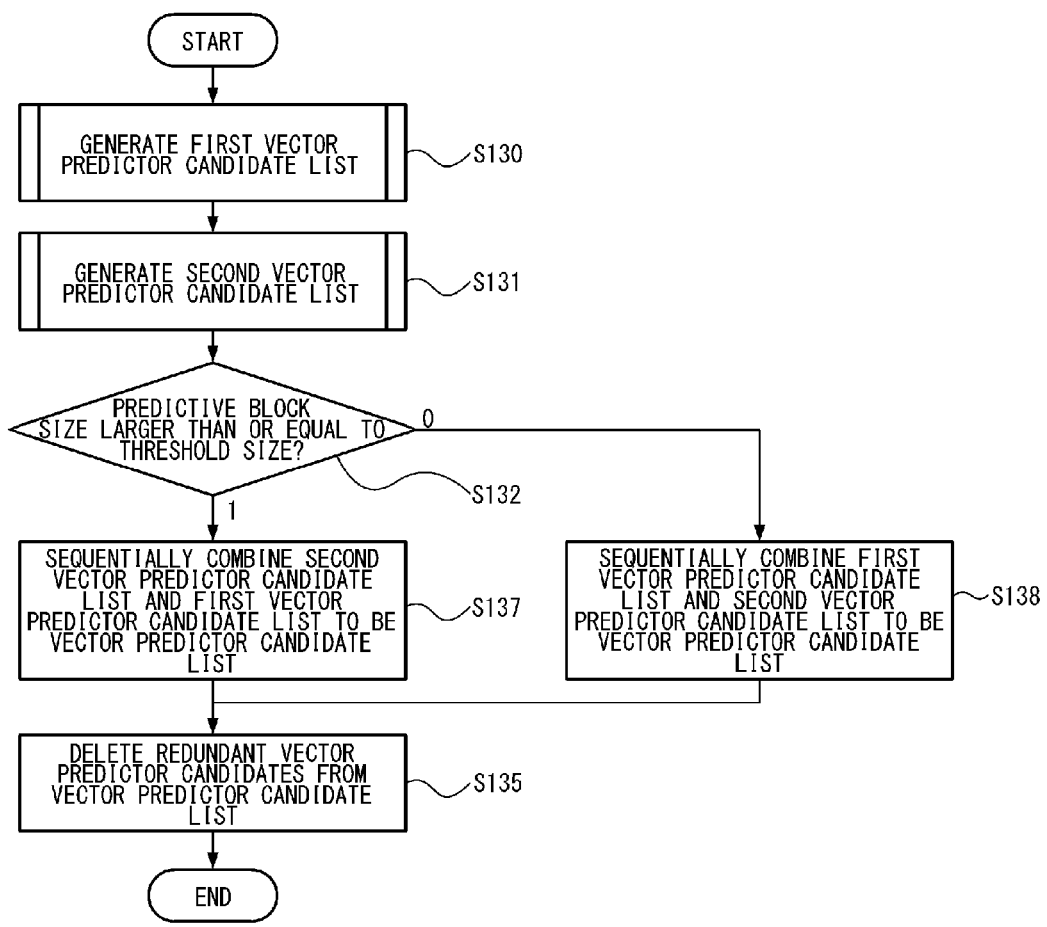
FIG. 20 is a flowchart for explaining the operations of the vector predictor candidate list generating unit according to the extended example of the first embodiment.

FIG. 20 illustrates a flowchart for explaining the operations of the vector predictor candidate list generating unit 120 according to the extended example of the present embodiment. The extended example is different from the first embodiment in that the second vector predictor candidate list and the first vector predictor candidate list are sequentially combined to be a vector predictor candidate list (step S136) instead of step S133, and the first vector predictor candidate list and the second vector predictor candidate list are sequentially combined to be a vector predictor candidate list (step S136) instead of step S134.

(Encode Control)

In the present embodiment, it is assumed that when the combination determination result is 1, the first vector predictor candidate list and the second vector predictor candidate list are combined to generate a vector predictor candidate list, and when the combination determination result is 0, a vector predictor candidate list is generated from only the first vector predictor candidate list. The process is performed in order to reduce the amount of codes of the vector predictor indexes by defining the common operations between encoding and decoding.

In order only to reduce the amount of calculations, the first vector predictor candidate list and the second vector predictor candidate list are combined to generate a vector predictor candidate list irrespective of the combination determination result, and in selecting a vector predictor index in the encoding device, if the combination determination result is 0, the motion vectors contained in the second vector predictor candidate list can be controlled not to be selected as vector predictors. The moving picture encoding device in this case has the following properties.

A moving picture encoding device with motion compensating prediction by a plurality of block sizes, including:

a first vector predictor candidate list generating unit configured to generate a first vector predictor candidate list containing first motion vector predictor candidates from motion vectors of one or more encoded neighboring blocks to blocks to be encoded;

a second vector predictor candidate list generating unit configured to generate a second vector predictor candidate list containing second motion vector predictor candidates from motion vectors of blocks at the same positions as the blocks to be encoded and one or more neighboring blocks to the blocks at the same positions;

a third vector predictor candidate list generating unit configured to generate a third vector predictor candidate list combining the first vector predictor candidate list and the second vector predictor candidate list;

a combination determining unit configured to determine whether to use the second vector predictor candidate list by a comparison result between a block size of the blocks to be encoded and a predetermined threshold size;

a vector predictor selecting unit configured to select, when the block size of the blocks to be encoded is smaller than the predetermined threshold size, select a motion vector predictor from the first vector predictor candidate list in the third vector predictor candidate list without selecting the second vector predictor candidate list in the third vector predictor candidate list; and an encoding unit configured to encode information on the position of the selected motion vector predictor in the third vector predictor candidate list.

(Extension of Candidate List Generation)

In the present embodiment, encoding and decoding a vector predictor index has been described with a motion vector as a target of a candidate list to be generated. According to the present embodiment, a candidate list to be generate is not only for the motion vectors, and there may be employed any method for generating a first candidate list from information on processed neighboring blocks to blocks to be processed, generating a second candidate list from information on neighboring blocks at the same positions as blocks to be processed in a processed image, generating a third candidate list from the first candidate list and the second candidate list, and thereby deciding an index to be encoded and decoded from the third candidate list. For example, the present embodiment is applicable to a merge direction index (merge index) indicating a direction in which the motion information is merged.

In this case, the reference image indexes and the motion compensating prediction directions are similarly managed in addition to the motion vectors in the first candidate list, the second candidate list and the third candidate list, and the motion information on the blocks indicated by the merge direction index including the motion vectors, the reference image indexes and the motion compensating prediction direction is used as motion information on the blocks to be processed. That is, the vector predictor described in the present embodiment is used as the motion vector as it is. NumMergeCands( ) described in syntax returns the number of candidates contained in the candidate list similarly to NumMvpCands( ). The Truncated Unary code string is used for the code string with the merge direction index similarly to the code string with the vector predictor index.

(Advantages of First Embodiment)

As described above, when the neighboring area including the predictive block size to be processed is less likely to move in parallel or to be still, that is, when the predictive block size to be processed is small, the motion vector of a different image from the predictive blocks to be processed is controlled not to be added to the motion vector predictor candidates so that the number of vector predictor candidates can be reduced, the amount of codes of the vector predictor indexes can be reduced, and thereby the moving picture encoding device capable of preventing a reduction in motion compensating prediction efficiency can be realized. On the other hand, when the predictive block size to be processed is large, the motion vector of a different image from the predictive blocks to be processed is added to the motion vector predictor candidates, thereby enhancing the vector predictor accuracy.

The number of vector predictor candidates is reduced, thereby restricting the amount of accesses to the motion vector memory and reducing the amount of processing. For example, if the motion vector of the different image is present in an external memory or the like, the restriction in the amount of accesses to the motion vector memory is largely advantageous.

A distance (temporal difference) between the image to be processed in which the predictive blocks to be processed are present and the different decoded image from the image to be processed in which the second group of candidate blocks is present is increased, that is, when the correlation between the motion information is lower, the motion vector of the different image is controlled not to be added to the motion vector predictor candidates, thereby realizing the similar advantages to the above.

The above advantages are more conspicuous as the screen size is larger.

[Second Embodiment]

Figure 21:
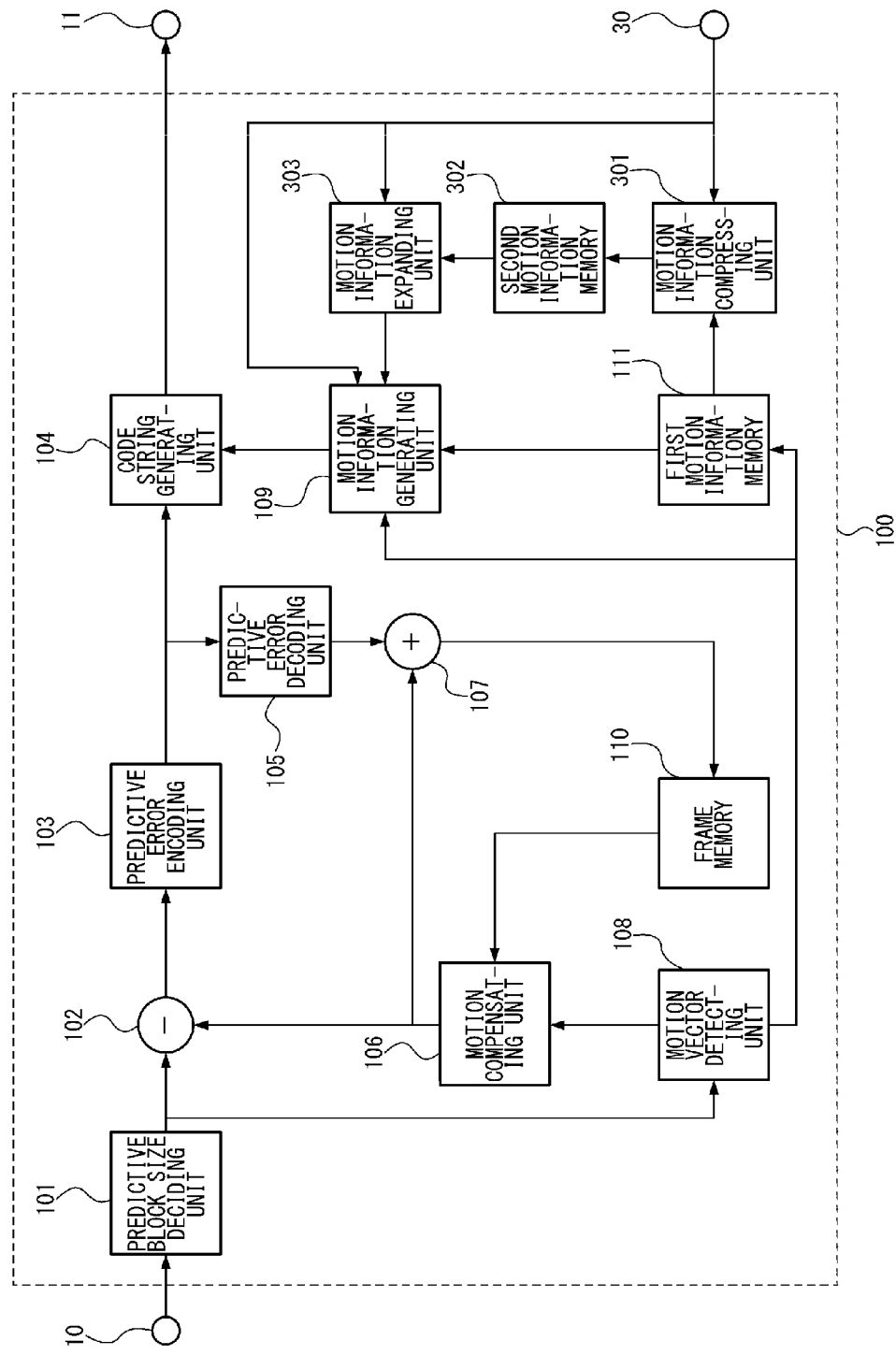
FIG. 21 is a diagram for explaining a structure of a moving picture encoding device according to a second embodiment.

FIG. 21 illustrates a structure of a moving picture encoding device 300 according to a second embodiment of the present invention. The structure of the moving picture encoding device 300 according to the second embodiment of the present invention is the same as the structure of the moving picture encoding device 100 according to the first embodiment except the setting of a terminal 30, a motion information compressing unit 301, a second motion information memory 302, a motion information expanding unit 303 and the motion information generating unit 109.

The differences from the first embodiment in the setting of the terminal 30 and the functions of the motion information compressing unit 301, the second motion information memory 302, the motion information expanding unit 303 and the motion information generating unit 109 according to the present embodiment will be described below.

A motion information memory compression ratio $\alpha$ and a temporal vector use restriction level $\beta$ are supplied from the terminal 30, the motion information memory compression ratio $\alpha$ is supplied to the motion information generating unit 109, the motion information compressing unit 301 and the motion information expanding unit 303, and the temporal vector use restriction level $\beta$ is supplied to the motion information generating unit 109.

The motion information compressing unit 301 compresses a motion vector and a reference image index supplied from the first motion information memory 111 in the $\frac{1}{2}^{\alpha}$ memory area based on the motion information memory compression ratio $\alpha$, and supplies them to the second motion information memory 302.

The second motion information memory 302 has the $\frac{1}{2}^{\alpha}$ memory capacity of the second motion information memory 112 according to the first embodiment, and stores the motion vectors and the reference image indexes supplied from the motion information compressing unit 301 for a predetermined number of images.

The motion information expanding unit 303 expands the motion vector and the reference image index supplied from the second motion information memory 302 based on the motion information memory compression ratio $\alpha$, and supplies them to the motion information generating unit 109.

The motion information memory compression ratio $\alpha$ will be described. The motion information memory compression ratio $\alpha$ is set to reduce the memory capacity of the second motion information memory 302, and thereby the motion information memory areas having a size of $2^{\alpha}$ (which is called "compression size") for the horizontal and vertical directions are compressed into one memory area. At this time, the motion information stored in the memory areas having a size of $2^{\alpha}$ is put together to be replaced with one representative value, and the representative value is stored in the memory area allocated in units of block size compressed into $\frac{1}{2}^{\alpha}$. For example, the motion vectors stored in the memory areas having a size of $2^{\alpha}$ take the average value to be replaced with one representative motion vector, which is stored in the memory area compressed into $\frac{1}{2}^{\alpha}$. $\alpha$ is assumed as 5 in the present embodiment.

Figure 22:
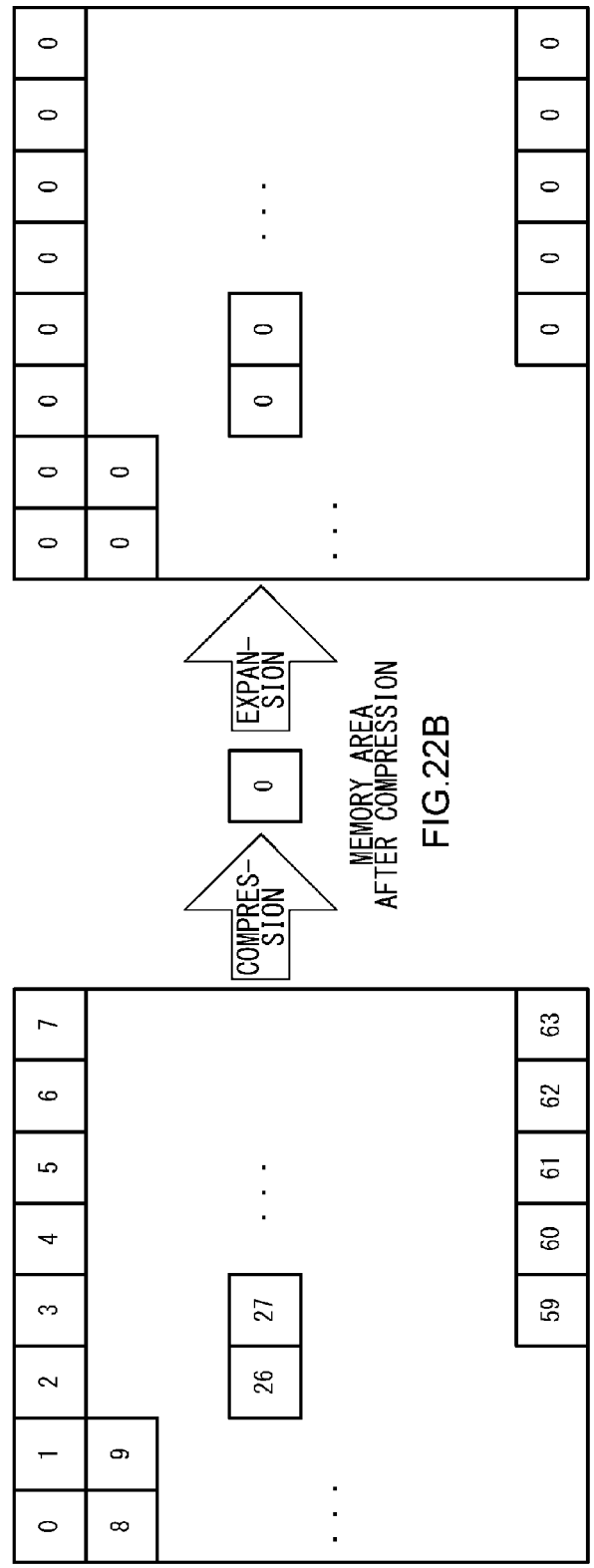
FIGS. 22A to 22C are diagrams for explaining compression and expansion of motion information by a motion information compressing unit and a motion information expanding unit of FIG. 21.

Compression and expansion of the motion information will be described with reference to FIGS. 22A to 22C. FIG. 22A illustrates 64 memory areas from memory area 0 to memory area 63 in the first motion information memory 111 before compression. In the present embodiment, a representative value of the 64 memory areas is assumed as a value stored in the memory area 0. FIG. 22B illustrates how the value of the memory area 0 in the first motion information memory 111 is stored in one memory area in the second motion information memory 302 after compression. FIG. 22C illustrates how the value of one memory area in the second motion information memory 302 is copied into the 64 memory areas to be supplied to the motion information generating unit 109 after expansion.

The motion information memory compression ratio α is assumed at 5 in the present embodiment, but the motion information memory compression ratio α may be larger than or equal to 0. The representative value of the memory areas is assumed at the memory area 0, but may be the memory area 27 at the center or its neighboring block area, or may be the average value or the median value among the memory area 0 to the memory area 63.

The motion information generating unit 109 is supplied with the motion information memory compression ratio α and the temporal vector use restriction level β, and only the function of the combination determining unit 131 in the vector predictor candidate list generating unit 120 is different from the first embodiment.

The combination determining unit 131 will be described below. The derivation of a combination determination result according to the present embodiment is different from the derivation of a combination determination result according to the first embodiment in that the predetermined threshold size as a reference value is replaced with the following combination permitted size.

The derivation of a combination determination result according to the present embodiment is performed by comparing the predictive block size of the blocks to be processed with the combination permitted size derived by the motion information memory compression ratio α and the temporal vector use restriction level β. If the predictive block size of the blocks to be processed is larger than or equal to the combination permitted size decided by the motion information memory compression ratio α and the temporal vector use restriction level β, the combination determination result is set to 1, and otherwise, is set to 0.

The combination permitted size is $2^{\alpha-\beta}$ ($\beta \leq \alpha$) in both the horizontal direction and the vertical direction. Assuming β=0, the combination permitted size is equal to the memory area size (that is, the above compression size) decided by the motion information memory compression ratio, and assuming β=α, the combination permitted size is 1, and thus all the predictive block sizes are permitted to combine. β=0 is assumed in the present embodiment. That is, the combination permitted size is 32 pixels×32 pixels.

In the moving picture encoding device 100 according to the present embodiment, the motion information memory compression ratio α and the temporal vector use restriction level β are encoded according to the syntax of FIG. 23 in a higher SPS to be the code strings. In the syntax of FIG. 23, the motion information memory compression ratio α (mv_compression_ratio) and the temporal vector use restriction level β (temporal_mv_restrict_idc) are set in part of SPS (Sequence Parameter Set), but may be set in PPS (Picture Parameter Set) in a lower hierarchy than SPS, or in a slice header. The motion information memory compression ratio α and the temporal vector use restriction level β have only to derive the memory area size and the combination permitted size are not limited to the form in FIG. 23. For example, the motion information memory compression ratio α and the temporal vector use restriction level β may be indicated by the number of CU divisions indicated in FIG. 32. The motion information memory compression ratio α and the temporal vector use restriction level β may be individually set in the horizontal direction and in the vertical direction.

(Operations of Encoding Device)

Figure 24:
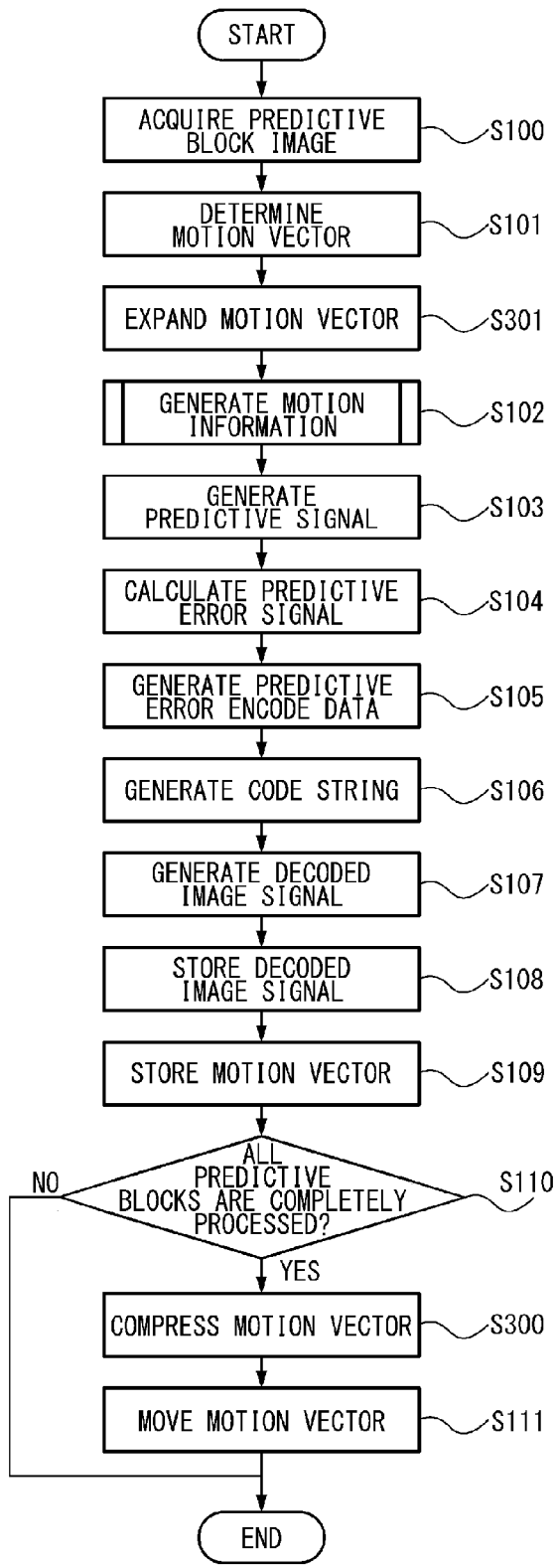
FIG. 24 is a flowchart for explaining the encoding operations of the moving picture encoding device according to the second embodiment.

Subsequently, the encoding operations in the moving picture encoding device 300 according to the present embodiment will be described with reference to the flowchart of FIG. 24. The differences from the first embodiment will be described.

At first, the motion information memory compression ratio α and the temporal vector use restriction level β are encoded in the higher SPS.

After all the predictive blocks are completely processed (YES in step S110), the motion information compressing unit 301 compresses the motion vector and the reference image index supplied from the first motion information memory 111 into the $\frac{1}{2}^{\alpha}$ memory area based on the motion information memory compression ratio α (step S300).

After step S101, the motion information expanding unit 303 expands the motion vector and the reference image index supplied from the second motion information memory 302 based on the motion information memory compression ratio α, and supplies them to the motion information generating unit 109 (step S301).

Figure 25:
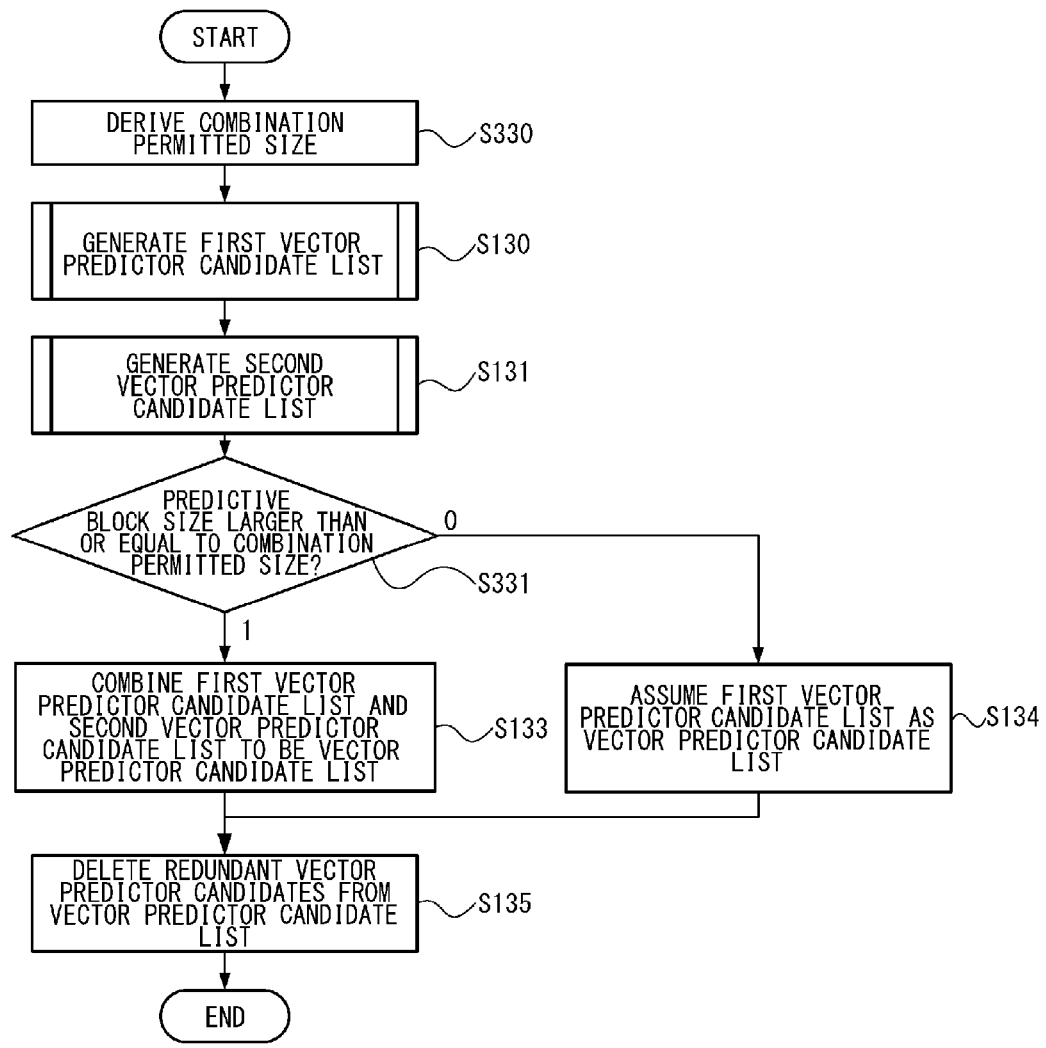
FIG. 25 is a flowchart for explaining the operations of a vector predictor candidate list generating unit according to the second embodiment.

Subsequently, the differences from the first embodiment in the operations of the combination determining unit 131 in the vector predictor candidate list generating unit 120 according to the present embodiment will be described with reference to the flowchart of FIG. 25. FIG. 25 illustrates the operations of the vector predictor candidate list generating unit 120.

At first, the combination determining unit 131 derives a combination permitted size by the motion information memory compression ratio α and the temporal vector use restriction level β (step S330).

The combination determining unit 131 derives a combination determination result from the predictive block size of the predictive blocks to be processed and the combination permitted size (step S132).

(Structure and Functions of Decoding Device)

Figure 26:
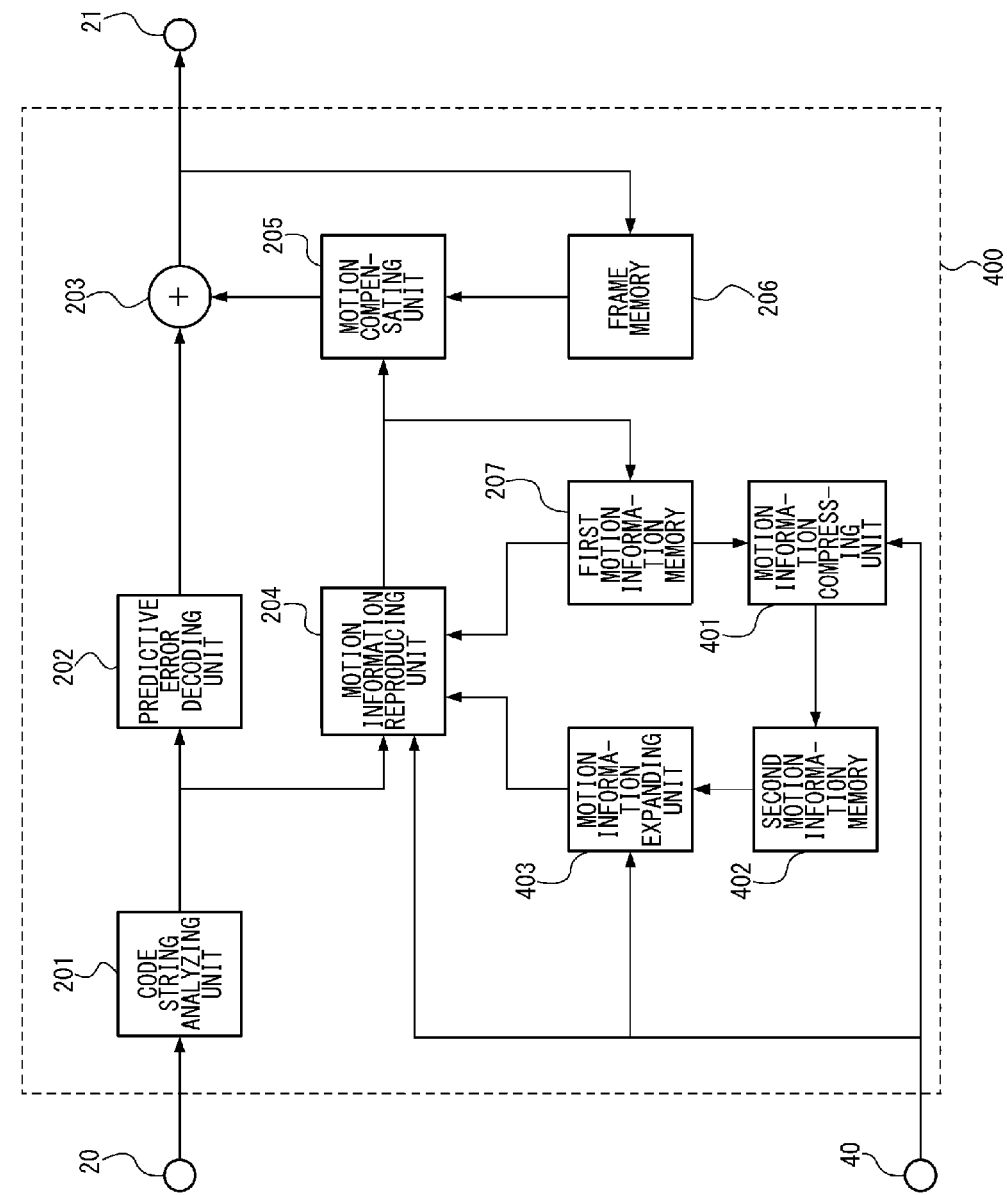
FIG. 26 is a diagram for explaining a moving picture decoding device according to the second embodiment.

A moving picture decoding device according to the present embodiment will be described below. FIG. 26 illustrates a moving picture decoding device 400 according to the present embodiment. The moving picture decoding device 400 is directed for decoding the code string encoded by the moving picture encoding device 300 to generate a reproduced image.

The structure of the moving picture decoding device 400 according to the second embodiment of the present invention is the same as the structure of the moving picture decoding device 200 according to the first embodiment except a motion information compressing unit 401, a second motion information memory 402, a motion information expanding unit 403 and the motion information reproducing unit 204.

The differences from the first embodiment in the functions of the motion information compressing unit 401, the second motion information memory 402, the motion information expanding unit 403 and the motion information reproducing unit 204 according to the present embodiment will be described below.

In the moving picture decoding device 400 according to the present embodiment, the motion information memory compression ratio α and the temporal vector use restriction level β are decoded from the code strings according to the syntax of FIG. 23 in the higher SPS, and are supplied from a terminal 40. The motion information memory compression ratio α is supplied to the motion information compressing unit 401, the motion information expanding unit 403, and the motion information reproducing unit 204 from the terminal 40, and the temporal vector use restriction level β is supplied to the motion information reproducing unit 204.

The functions of the motion information compressing unit 401, the second motion information memory 402 and the motion information expanding unit 403 are the same as those of the motion information compressing unit 301, the second motion information memory 302 and the motion information expanding unit 303 in the moving picture encoding device 300 according to the present embodiment, respectively.

The motion information reproducing unit 204 is supplied with the motion information memory compression ratio α and the temporal vector use restriction level β, and only the function of the combination determining unit 131 in the vector predictor candidate list generating unit 120 is different. The function of the combination determining unit 131 in the vector predictor candidate list generating unit 120 is the same as that in the moving picture encoding device 300 according to the present embodiment.

(Operations of Decoding Device)

Figure 27:
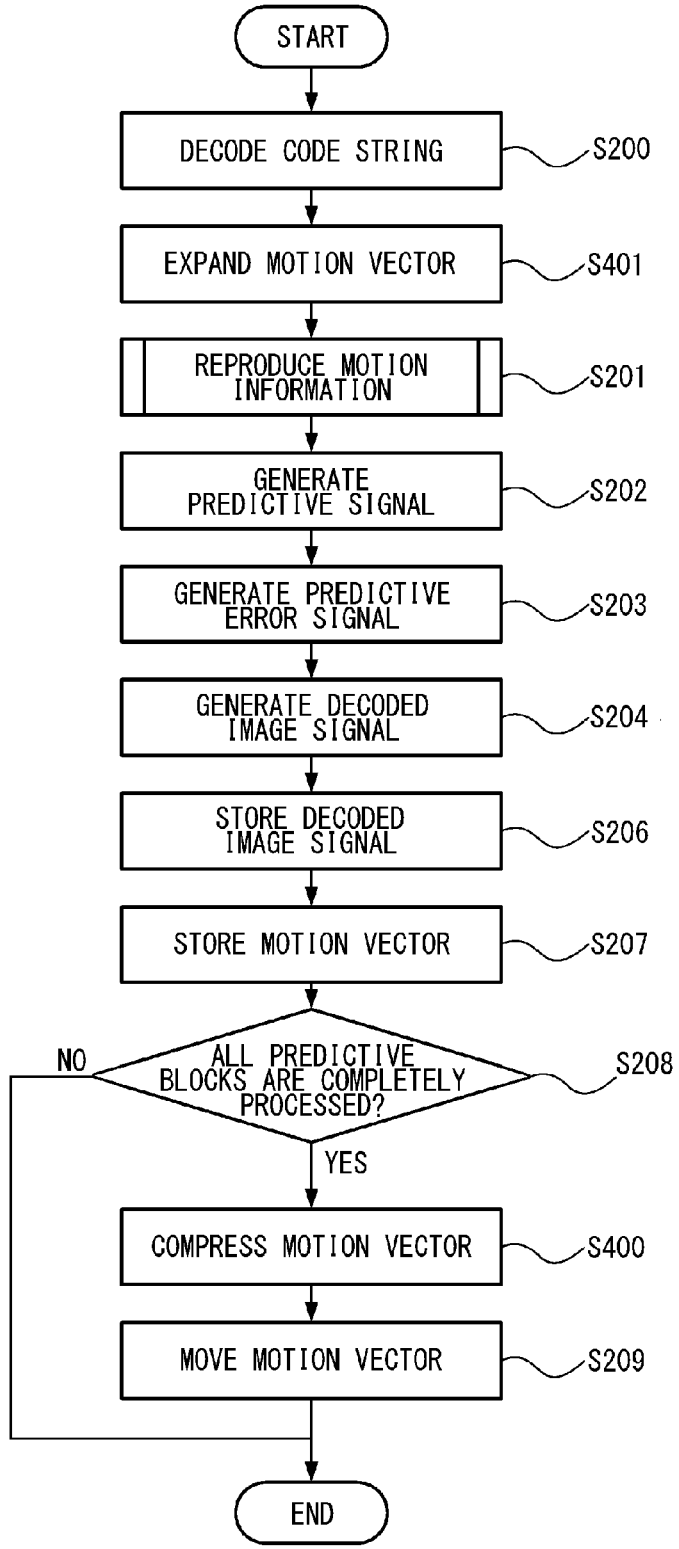
FIG. 27 is a flowchart for explaining the decoding operations of the moving picture decoding device according to the second embodiment.

Subsequently, the decoding operations in the moving picture decoding device 400 according to the present embodiment will be described with reference to the flowchart of FIG. 27. The differences from the first embodiment will be described.

At first, the motion information memory compression ratio α and the temporal vector use restriction level β are decoded in the higher SPS.

After all the predictive blocks are completely processed (YES in step S205), the motion information compressing unit 401 compresses the motion vector and the reference image index supplied from the first motion information memory 207 based on the motion information memory compression ratio α into the $½^α$ memory area (step S400).

Before step S201, the motion information expanding unit 403 expands the motion vector and the reference image index supplied from the second motion information memory 402 based on the motion information memory compression ratio α, and supplies them to the motion information reproducing unit 204 (step S401).

(Variant of Second Embodiment)

The present embodiment can apply the following variant.

The compressed motion vector and reference index stored in the second motion information memory are expanded in the motion information expanding unit and the expanded motion vector and reference index are supplied to the motion information generating unit or the motion information reproducing unit in the present embodiment, but the present embodiment can be similarly performed without compression and expansion of the compressed motion vector and reference index.

For example, a memory address converting unit is installed instead of the motion information expanding unit and a memory address referred to in the expanded memory area is converted into a memory address of the compressed memory area, thereby accessing the motion information without expansion.

For example, assuming a representative value of the 64 memory areas of 8 blocks in the horizontal direction by 8 blocks in the vertical direction as the value stored in the memory area 0 as in FIGS. 22A to 22C, the horizontal position and the vertical position of the memory address referred to in the expanded memory area are assumed at blkX and blkY, respectively, and the horizontal position and the vertical position of the memory address of the compressed memory area are assumed at rblkX and rblkY, respectively, which can be calculated in Equation 1 and Equation 2. Herein, the Floor function is a function in which an input value is truncated to be an integer.

$$rblkX = \text{Floor}(blkX*8); \quad \text{(Equation 1)}$$

$$rblkY = \text{Floor}(blkY*8); \quad \text{(Equation 2)}$$

The motion information compressing unit 301 is omitted and the memory address converting unit is installed instead of the motion information expanding unit so that the memory address to be referred to can be converted into the memory address at which the representative value of the motion information is stored. For example, assuming a representative value of the 64 memory areas of 8 blocks in the horizontal direction by 8 blocks in the vertical direction as the value stored in the memory area 0 as in FIGS. 22A to 22C, the horizontal position and the vertical position of the referred memory address are assumed at blkX and blkY, respectively, and the horizontal position and the vertical position of the memory address at which the representative value is stored are assumed at rblkX and rblkY, respectively, which can be calculated in Equation 3 and Equation 4.

$$rblkX = \text{Floor}(blkX/8)*8; \quad \text{(Equation 3)}$$

$$rblkY = \text{Floor}(blkY/8)*8; \quad \text{(Equation 4)}$$

With the memory address conversion, the memory capacity cannot be reduced, but the compression and expansion processing can be reduced.

(Advantages of Second Embodiment)

As described above, when the predictive block size to be processed is small, the motion vector of the different compressed image is controlled not to be added to the motion vector predictor candidates, thereby accomplishing the moving picture encoding device capable of reducing the amount of calculations while restricting the use of different motion information from the original motion information and restricting a reduction in motion compensating prediction accuracy, reducing the number of vector predictor candidates, and reducing the amount of codes of the vector predictor indexes.

When the motion vector of the different compressed image is present in an external memory or the like, for example, there is an advantage that the amount of accesses to the motion vector memory can be restricted.

When information indicating the condition for restricting the use of the motion vector of the different image as a vector predictor is decoded, the definition of the motion information memory compression ratio is decoded together, thereby promoting to compress the motion information memory when the use of the motion vector of the different image is restricted, and realizing the efficient use of the motion information memory. The flag is shared so that an increase in the amount of codes of the flag can be restricted for restriction in the use of the motion vector of the different image in a lower hierarchy and the definition of the motion information memory compression ratio.

The encode stream of a moving picture output by the moving picture encoding device according to the above-described embodiments has a specific data format to be decoded according to the encoding method used in the embodiments, and the moving picture decoding device corresponding to the moving picture encoding device can decode the encode stream having the specific data format.

When a wired or wireless network is used for exchanging the encode stream between the moving picture encoding device and the moving picture decoding device, the encode stream may be converted into a data format suitable for a transmission form of the communication path for transmission. In this case, there are provided a moving picture transmitting device for converting an encode stream output by the moving picture encoding device into encode data in a data form suitable to a transmission form of the communication path and transmitting it to a network and a moving picture receiving device for receiving the encode data from the network, restoring it into the encode stream and supplying it to the moving picture decoding device.

The moving picture transmitting device includes a memory for buffering the encode stream output from the moving picture encoding device, a packet processing unit configured to packetizing the encode stream, and a transmitting unit configured to transmit the packetized encode data via a network. The moving picture receiving device includes a receiving unit configured to receive the packetized encode data via the network, a memory configured to buffer the received encode data, and a packet processing unit configured to packetize the encode data to generate the encode stream, and provide it to the moving picture decoding device.

The encode and decode processes described above can be naturally accomplished by transmitting, storing and receiving devices using hardware, and can be accomplished in firmware stored in Read Only Memory (ROM) or flash memory, or in software such as computer. The firmware program and the software program may be recoded and provided in a computer readable recording medium, may be provided from a server via a wired or wireless network, or may be provided as data broadcast of terrestrial or satellite digital broadcasting.

The present invention has been described above byway of the embodiments. The embodiments are exemplary, and it can be understood by those skilled in the art that combinations of the components and the processes are possible in many variants and the variants are encompassed in the scope of the present invention.

The present invention may be configured in the following forms.

[Item 1] A moving picture encoding device with motion compensating prediction in units of block, including:
a motion vector predictor candidate generating unit configured to, when a block size of blocks to be encoded is larger than a predetermined threshold size, derive motion vector predictor candidates from blocks in an encoded image, and when the block size of the blocks to be encoded is smaller than or equal to the predetermined threshold size, configured not to derive the motion vector predictor candidates.

[Item 2] A moving picture encoding device with motion compensating prediction in units of block, including:
a motion vector predictor candidate list generating unit configured to, when a block size of blocks to be encoded is larger than a predetermined threshold size, contain motion vector predictor candidates obtained from blocks in an encoded image in a motion vector predictor candidate list, and when the block size of the blocks to be encoded is smaller than or equal to the predetermined threshold size, configured not to contain the motion vector predictor candidates in the motion vector predictor candidate list;
a motion vector predictor selecting unit configured to select a motion vector predictor of the blocks to be encoded from the motion vector predictor candidate list; and
an encoding unit configured to encode information on the position of the selected motion vector predictor from the motion vector predictor candidate list.

[Item 3] The moving picture encoding device according to Item 1 or 2, wherein the blocks in the encoded image are blocks at the same positions as the blocks to be encoded or blocks neighboring the blocks at the same positions.

[Item 4] The moving picture encoding device according to any one of Items 1 to 3, wherein the encoding unit encodes information on the predetermined threshold size.

[Item 5] The moving picture encoding device according to any one of Items 1 to 4, wherein the motion vector of the blocks in the encoded image is set at the motion vector of any one block in a predetermined region per predetermined region.

[Item 6] The moving picture encoding device according to Item 5, wherein the predetermined threshold size is set to be smaller than the predetermined region.

[Item 7] The moving picture encoding device according to any one of Items 1 to 6, wherein the predetermined threshold size is controlled to be larger as a temporal difference between the image containing the blocks to be encoded and the encoded image is longer.

[Item 8] A moving picture encoding device with motion compensating prediction in units of block, including:
a spatial motion vector predictor candidate generating unit configured to derive spatial motion vector predictor candidates from neighboring blocks to blocks to be encoded;
a temporal motion vector predictor candidate generating unit configured to derive temporal motion vector predictor candidates from blocks in an encoded image;
a motion vector predictor candidate list generating unit configured to, when use permission information indicating whether to permit the use of a temporal motion vector predictor indicates permission, generate a motion vector predictor candidate list from the special motion vector predictor candidates and the temporal motion vector predictor candidates, and when the use permission information indicates non-permission, generate a motion vector predictor candidate list from the spatial motion vector predictor candidates;
a motion vector predictor selecting unit configured to select a motion vector predictor of the blocks to be encoded from the motion vector predictor candidate list; and
an encoding unit configured to encode information on the position of the selected motion vector predictor from the motion vector predictor candidate list.

[Item 9] The moving picture encoding device according to Item 8, wherein the blocks in the encoded image are blocks at the same positions as the blocks to be encoded, or blocks neighboring the blocks at the same positions.

[Item 10] The moving picture encoding device according to Item 8 or 9, wherein the encoding unit encodes the use permission information.

[Item 11] The moving picture encoding device according to any one of Items 8 to 10, wherein the motion vector of the blocks in the encoded image is set at the motion vector of any one block in a predetermined region per predetermined region.

[Item 12] A moving picture encoding device with motion compensating prediction by a plurality of block sizes, including:
a first vector predictor candidate list generating unit configured to generate a first vector predictor candidate list containing first motion vector predictor candidates from motion vectors of one or more encoded neighboring blocks to blocks to be encoded;

a second vector predictor candidate list generating unit configured to generate a second vector predictor candidate list containing second motion vector predictor candidates from motion vectors of blocks at the same positions as the blocks to be encoded in an encoded image and one or more neighboring blocks to the blocks at the same positions;

a combination determining unit configured to determine whether to generate a third vector predictor candidate list combining the first vector predictor candidate list and the second vector predictor candidate list by a comparison result between a block size of the blocks to be encoded and a predetermined threshold size;

a third vector predictor candidate list generating unit configured to, when the block size of the blocks to be encoded is smaller than the predetermined threshold size, generate the third vector predictor candidate list from the first vector predictor candidate list without combining the second vector predictor candidate list;

a vector predictor selecting unit configured to select a motion vector predictor of the blocks to be encoded from the third vector predictor candidate list; and an encoding unit configured to encode information on the position of the selected motion vector predictor from the third vector predictor candidate list.

[Item 13] A moving picture encoding device with motion compensating prediction by a plurality of block sizes, including:

a first motion vector storing unit configured to store and manage motion vectors of encoded blocks in a memory area allocated in units of minimum block size;

a first vector predictor candidate list generating unit configured to generate a first vector predictor candidate list containing first motion vector predictor candidates from motion vectors of one or more encoded neighboring blocks to blocks to be encoded with reference to the first motion vector storing unit;

a second motion vector storing unit configured to put together motion vectors in units of minimum block size in an encoded image with a predetermined compression size to be replaced with one representative motion vector, and store and manage it in a memory area allocated in units of compression size;

a second vector predictor candidate list generating unit configured to generate a second vector predictor candidate list containing second motion vector predictor candidates from motion vectors of blocks at the same positions as the blocks to be encoded in an encoded image and one or more neighboring blocks to the blocks at the same positions with reference to the second motion vector storing unit;

a combination determining unit configured to determine whether to generate a third vector predictor candidate list combining the first vector predictor candidate list and the second vector predictor candidate list by a comparison result between a block size of the blocks to be encoded and a predetermined threshold size;

a third vector predictor candidate list generating unit configured to, when the block size of the blocks to be encoded is smaller than the predetermined threshold size, generate the third vector predictor candidate list form the first vector predictor candidate list without combining the second vector predictor candidate list;

a vector predictor selecting unit configured to select a motion vector predictor of the blocks to be encoded from the third vector predictor candidate list; and an encoding unit configured to encode information on the position of the selected motion vector predictor from the third vector predictor candidate list.

[Item 14] A moving picture encoding method with motion compensating prediction in units of block, including:

a motion vector predictor candidate generating step of, when a block size of blocks to be encoded is larger than a predetermined threshold size, deriving motion vector predictor candidates from blocks in an encoded image, and when the block size of the blocks to be encoded is smaller than or equal to the predetermined threshold size, not deriving the motion vector predictor candidates.

[Item 15] A moving picture encoding method with motion compensating prediction in units of block, including:

a motion vector predictor candidate list generating step of, when a block size of blocks to be encoded is larger than a predetermined threshold size, containing motion vector predictor candidates obtained from blocks in an encoded image in a motion vector predictor candidate list, and when the block size of the blocks to be encoded is smaller than or equal to the predetermined threshold size, not containing the motion vector predictor candidates in the motion vector predictor candidate list;

a motion vector predictor selecting step of selecting a motion vector predictor of the blocks to be encoded from the motion vector predictor candidate list; and an encoding step of encoding information on the position of the selected motion vector predictor from the motion vector predictor candidate list.

[Item 16] A moving picture encoding method with motion compensating prediction in units of block, including:

a spatial motion vector predictor candidate generating step of deriving spatial motion vector predictor candidates from neighboring blocks to blocks to be encoded;

a temporal motion vector predictor candidate generating step of deriving temporal motion vector predictor candidates from blocks in an encoded image;

a motion vector predictor candidate list generating step of, when use permission information indicating whether to permit the use of a temporal motion vector predictor indicates permission, generating a motion vector predictor candidate list from the spatial motion vector predictor candidates and the temporal motion vector predictor candidates, and when the use permission information indicates non-permission, generating a motion vector predictor candidate list from the spatial motion vector predictor candidates;

a motion vector predictor selecting step of selecting a motion vector predictor of the blocks to be encoded from the motion vector predictor candidate list; and an encoding step of encoding information on the position of the selected motion vector predictor from the motion vector predictor candidate list.

[Item 17] A moving picture encoding program with motion compensating prediction in units of block, the program causing a computer to perform a motion vector predictor candidate generating step of, when a block size of blocks to be encoded is larger than a predetermined threshold size, deriving motion vector predictor candidates from blocks in an encoded image, and when the block size of the blocks to be encoded is smaller than or equal to the predetermined threshold size, not deriving the motion vector predictor candidates.

[Item 18] A moving picture encoding program with motion compensating prediction in units of block, the program causing a computer to perform:

a motion vector predictor candidate list generating step of, when a block size of blocks to be encoded is larger than a predetermined threshold size, containing motion vector predictor candidates obtained from blocks in an encoded image in a motion vector predictor candidate list, and when the block size of the blocks to be encoded is smaller than or equal to the predetermined threshold size, not containing the motion vector predictor candidates in the motion vector predictor candidate list;

a motion vector predictor selecting step of selecting a motion vector predictor of the blocks to be encoded from the motion vector predictor candidate list; and an encoding step of encoding information on the position of the selected motion vector predictor from the motion vector predictor candidate list.

[Item 19] A moving picture encoding program with motion compensating prediction in units of block, the program causing a computer to perform:

a spatial motion vector predictor candidate generating step for deriving spatial motion vector predictor candidates from neighboring blocks to blocks to be encoded;

a temporal motion vector predictor candidate generating step of deriving temporal motion vector predictor candidates from blocks in an encoded image;

a motion vector predictor candidate list generating step of, when use permission information indicating whether to permit the use of a temporal motion vector predictor indicates permission, generating a motion vector predictor candidate list from the spatial motion vector predictor candidates and the temporal motion vector predictor candidates, and when the use permission information indicates non-permission, generating a motion vector predictor candidate list from the spatial motion vector predictor candidates;

a motion vector predictor selecting step of selecting a motion vector predictor of the blocks to be encoded from the motion vector predictor candidate list; and an encoding step of encoding information on the position of the selected motion vector predictor from the motion vector predictor candidate list.

[Item 20] A moving picture decoding device with motion compensating prediction in units of block, including:

a motion vector predictor candidate generating unit configured to, when a block size of blocks to be decoded is larger than a predetermined threshold size, derive motion vector predictor candidates from blocks in a decoded image, and when the block size of the blocks to be decoded is smaller than or equal to the predetermined threshold size, configured not to derive the motion vector predictor candidates.

[Item 21] A moving picture decoding device with motion compensating prediction in units of block, including:

a motion vector predictor candidate list generating unit configured to, when a block size of blocks to be decoded is larger than a predetermined threshold size, contain motion vector predictor candidates obtained from blocks in a decoded image in a motion vector predictor candidate list, and when the block size of the blocks to be decoded is smaller than or equal to the predetermined threshold size, configured not to contain the motion vector predictor candidates in the motion vector predictor candidate list;

a decoding unit configured to decode information on the position of a motion vector predictor to be referred to in the motion vector predictor candidate list; and a motion vector predictor selecting unit configured to select a motion vector predictor of the blocks to be decoded from the motion vector predictor candidate list based on the information on the position of a motion vector predictor to be referred to in the motion vector predictor candidate list.

[Item 22] The moving picture decoding device according to Item 20 or 21, wherein the blocks in the decoded image are blocks at the same positions as the blocks to be decoded or blocks neighboring the blocks at the same positions.

[Item 23] The moving picture decoding device according to any one of Items 20 to 22, wherein the decoding unit decodes the information on the predetermined threshold size, and obtains the predetermined threshold size.

[Item 24] The moving picture decoding device according to any one of Items 20 to 23, wherein the motion vector of the blocks in the decoded image is set at the motion vector of any one block in a predetermined region per predetermined region.

[Item 25] The moving picture decoding device according to Item 24, wherein the predetermined threshold size is set to be smaller than the predetermined region.

[Item 26] The moving picture decoding device according to any one of Items 20 to 25, wherein the predetermined threshold size is controlled to be larger as a temporal difference between the image containing the blocks to be decoded and the decoded image is longer.

[Item 27] A moving picture decoding device with motion compensating prediction in units of block, including:

a decoding unit configured to decode information on the position of a motion vector predictor to be referred to in a motion vector predictor candidate list;

a spatial motion vector predictor candidate generating unit configured to derive spatial motion vector predictor candidates from neighboring blocks to blocks to be decoded;

a temporal motion vector predictor candidate generating unit configured to derive temporal motion vector predictor candidates from blocks in a decoded image;

a motion vector predictor candidate list generating unit configured to, when use permission information indicating whether to permit the use of a temporal motion vector predictor indicates permission, generate a motion vector predictor candidate list from the spatial motion vector predictor candidates and the temporal motion vector predictor candidates, and when the use permission information indicates non-permission, generate a motion vector predictor candidate list from the spatial motion vector predictor candidates; and a motion vector predictor selecting unit configured to select a motion vector predictor of the blocks to be decoded from the motion vector predictor candidate list based on the information on the position of the motion vector predictor.

[Item 28] The moving picture decoding device according to Item 27, wherein the blocks in the decoded image are blocks at the same positions as the blocks to be decoded or blocks neighboring the blocks at the same positions.

[Item 29] The moving picture decoding device according to Item 27 or 28, wherein the decoding unit decodes the use permission information.

[Item 30] The moving picture decoding device according to any one of Items 27 to 29, wherein the motion vector of the blocks in the decoded image is set at the motion vector of any one block in a predetermined region per predetermined region.

[Item 31] A moving picture decoding device with motion compensating prediction by a plurality of block sizes, including:

a decoding unit configured to decode information on the position of a motion vector predictor to be referred to in a vector predictor candidate list;

a first vector predictor candidate list generating unit configured to generate a first vector predictor candidate list containing first motion vector predictor candidates from motion vectors of one or more decoded neighboring blocks to blocks to be decoded;

a second vector predictor candidate list generating unit configured to generate a second vector predictor candidate list containing second motion vector predictor candidates from motion vectors of blocks at the same positions as the blocks to be decoded in a decoded image and one or more neighboring blocks to the blocks at the same positions;

a combination determining unit configured to determine whether to generate a third vector predictor candidate list combining the first vector predictor candidate list and the second vector predictor candidate list by a comparison result between a block size of the blocks to be decoded and a predetermined threshold size;

a third vector predictor candidate list generating unit configured to generate the third vector predictor candidate list from the first vector predictor candidate list without combining the second vector predictor candidate list when the block size of the blocks to be decoded is smaller than the predetermined threshold size; and a vector predictor selecting unit configured to select a motion vector predictor of the blocks to be decoded from the third vector predictor candidate list based on the information on the position of the motion vector predictor to be referred to.

[Item 32] A moving picture decoding device with motion compensating prediction by a plurality of block sizes, including:

a decoding unit configured to decode information on the position of a motion vector predictor to be referred to in a vector predictor candidate list;

a first motion vector storing unit configured to store and manage motion vectors of decoded blocks in a memory area allocated in units of minimum block size;

a first vector predictor candidate list generating unit configured to generate a first vector predictor candidate list containing first motion vector predictor candidates from motion vectors of one or more decoded neighboring blocks to blocks to be decoded with reference to the first motion vector storing unit;

a second motion vector storing unit configured to put together motion vectors in units of minimum block size of a decoded image with a predetermined compression size to be replaced with one representative motion vector, and store and manage it in a memory area allocated in units of compression size;

a second vector predictor candidate list generating unit configured to generate a second vector predictor candidate list containing second motion vector predictor candidates from motion vectors of blocks at the same positions as the blocks to be decoded in a decoded image and one or more neighboring blocks to the blocks at the same positions with reference to the second motion vector storing unit;

a combination determining unit configured to determine whether to generate a third vector predictor candidate list combining the first vector predictor candidate list and the second vector predictor candidate list by a comparison result between a block size of the blocks to be decoded and a predetermined threshold size;

a third vector predictor candidate list generating unit configured to generate the third vector predictor candidate list from the first vector predictor candidate list without combining the second vector predictor candidate list when the block size of the blocks to be decoded is smaller than the predetermined threshold size; and a vector predictor selecting unit configured to select a motion vector predictor of the blocks to be decoded from the third vector predictor candidate list based on the information on the position of the motion vector predictor to be referred to.

[Item 33] A moving picture decoding method with motion compensating prediction in units of block, including:

a motion vector predictor candidate generating step of, when a block size of blocks to be decoded is larger than a predetermined threshold size, deriving motion vector predictor candidates from blocks in a decoded image, and when the block size of the blocks to be decoded is smaller than or equal to the predetermined threshold size, not deriving the motion vector predictor candidates.

[Item 34] A moving picture decoding method with motion compensating prediction in units of block, including:

a motion vector predictor candidate list generating step of, when a block size of blocks to be decoded is larger than a predetermined threshold size, containing motion vector predictor candidates obtained from blocks in a decoded image in a motion vector predictor candidate list, and when the block size of the blocks to be decoded is smaller than or equal to the predetermined threshold size, not containing the motion vector predictor candidates in the motion vector predictor candidate list;

a decoding step of decoding information on the position of a motion vector predictor to be referred to in the motion vector predictor candidate list; and a motion vector predictor selecting step of selecting a motion vector predictor of the blocks to be decoded from the motion vector predictor candidate list based on the information on the position of a motion vector predictor to be referred to in the motion vector predictor candidate list.

[Item 35] A moving picture decoding method with motion compensating prediction in units of block, including:

a decoding step of decoding information on the position of a motion vector predictor to be referred to in a motion vector predictor candidate list;

a spatial motion vector predictor candidate generating step of deriving spatial motion vector predictor candidates from neighboring blocks to blocks to be decoded;

a temporal motion vector predictor candidate generating step of deriving temporal motion vector predictor candidates from blocks in a decoded image;

a motion vector predictor candidate list generating step of, when use permission information indicating whether to permit the use of a temporal motion vector predictor indicates permission, generating a motion vector predictor candidate list from the spatial motion vector predictor candidates and the temporal motion vector predictor candidates, and when the use permission information indicates non-permission, generating a motion vector predictor candidate list from the spatial motion vector predictor candidates; and a motion vector predictor selecting step of selecting a motion vector predictor of the blocks to be decoded from the motion vector predictor candidate list based on the information on the position of the motion vector predictor.

[Item 36] A moving picture decoding program with motion compensating prediction in units of block, the program causing a computer to perform a motion vector predictor candidate generating step of, when a block size of blocks to be decoded is larger than a predetermined threshold size, deriving motion vector predictor candidates from blocks in a decoded image, and when the block size of the blocks to be decoded is smaller than or equal to the predetermined threshold size, not deriving the motion vector predictor candidates.

[Item 37] A moving picture decoding program with motion compensating prediction in units of block, the program causing a computer to perform:
a motion vector predictor candidate list generating step of, when a block size of blocks to be decoded is larger than a predetermined threshold size, containing motion vector predictor candidates obtained from blocks in a decoded image in a motion vector predictor candidate list, and when the block size of the blocks to be decoded is smaller than or equal to the predetermined threshold size, not containing the motion vector predictor candidates in the motion vector predictor candidate list;
a decoding step of decoding information on the position of a motion vector predictor to be referred to in the motion vector predictor candidate list; and
a motion vector predictor selecting step of selecting a motion vector predictor of the blocks to be decoded from the motion vector predictor candidate list based on the information on the position of a motion vector predictor to be referred to in the motion vector predictor candidate list.

[Item 38] A moving picture decoding program with motion compensating prediction in units of block, the program causing a computer to perform:
a decoding step of decoding information on the position of a motion vector predictor to be referred to in a motion vector predictor candidate list;
a spatial motion vector predictor candidate generating step of deriving spatial motion vector predictor candidates from neighboring blocks to blocks to be decoded;
a temporal motion vector predictor candidate generating step of deriving temporal motion vector predictor candidates from blocks in a decoded image;
a motion vector predictor candidate list generating step of, when use permission information indicating whether to permit the use of a temporal motion vector predictor indicates permission, generating a motion vector predictor candidate list from the spatial motion vector predictor candidates and the temporal motion vector predictor candidates, and when the use permission information indicates non-permission, generating a motion vector predictor candidate list from the spatial motion vector predictor candidates; and
a motion vector predictor selecting step of selecting a motion vector predictor of the blocks to be decoded from the motion vector predictor candidate list based on the information on the posit.

What is claimed is:

1. A moving picture decoding device with motion compensating prediction in units of block, comprising:
a motion vector predictor candidate generating unit configured to, when a block size of blocks to be decoded is larger than a predetermined threshold size, include a motion vector predictor candidate derived from blocks in a decoded image into a motion vector predictor candidate list, and when the block size of the blocks to be decoded is smaller than or equal to the predetermined threshold size, configured not to include the motion vector predictor candidate into the motion vector predictor candidate list;
a motion information candidate generating unit configured to, when the block size of blocks to be decoded is larger than the predetermined threshold size, include a motion information candidate derived from blocks in the decoded image into a motion information candidate list, and when the block size of the blocks to be decoded is smaller than or equal to the predetermined threshold size, configured not to include the motion information candidate into the motion information candidate list;
a decoding unit configured to decode a merge flag indicating using a merge index or a motion vector predictor index, wherein the decoding unit is, when the merge flag indicates to use the merge index, configured to decode the merge index on a position of motion information to be referred to in the motion information candidate list, and when the merge flag indicates to use the motion vector predictor index, configured to decode the motion vector predictor index on a position of motion vector predictor to be referred to in the motion vector predictor candidate list;
a motion information selecting unit configured to select motion information of the blocks to be decoded from the motion information candidate list based on information on the position of the motion information to be referred to in the motion information candidate list when the merge flag indicates to use the merge index; and
a motion vector predictor selecting unit configured to select a motion vector predictor of the blocks to be decoded from the motion vector predictor candidate list based on information on the position of the motion vector predictor to be referred to in the motion vector predictor candidate list when the merge flag indicates to use the motion vector predictor index, wherein the blocks in the decoded image are blocks at the same positions as the blocks to be decoded or blocks neighboring the blocks at the same positions, and the decoded image is temporally different from an image including the blocks to be decoded,
wherein a motion vector of the blocks in the decoded image is set to the motion vector of any one block in a predetermined region per predetermined region; and
wherein the predetermined threshold size is set to be smaller than a size of the predetermined region.

2. A moving picture decoding method with motion compensating prediction in units of block, comprising:
a motion vector predictor candidate generating step of, when a block size of blocks to be decoded is larger than a predetermined threshold size, including a motion vector predictor candidate derived from blocks in a decoded image into a motion vector predictor candidate list, and when the block size of the blocks to be decoded is smaller than or equal to the predetermined threshold size, not including the motion vector predictor candidate into the motion vector predictor candidate list;
a motion information candidate generating step of, when the block size of blocks to be decoded is larger than the predetermined threshold size, including a motion information candidate derived from blocks in the decoded image into a motion information candidate list, and when the block size of the blocks to be decoded is smaller than or equal to the predetermined threshold size, not including the motion information candidate into the motion information candidate list;
a decoding step of decoding a merge flag indicating using a merge index or a motion vector predictor index, wherein the decoding step, when the merge flag indicates to use the merge index, decodes the merge index on a position of motion information to be referred to in the motion information candidate list, and when the merge flag indicates to use the motion vector predictor index, decodes the motion vector predictor index on a position of motion vector predictor to be referred to in the motion vector predictor candidate list;
a motion information selecting step of selecting motion information of the blocks to be decoded from the motion information candidate list based on information on the position of the motion information to be referred to in the motion information candidate list when the merge flag indicates to use the merge index; and a motion vector predictor selecting step of selecting a motion vector predictor of the blocks to be decoded from the motion vector predictor candidate list based on information on the position of the motion vector predictor to be referred to in the motion vector predictor candidate list when the merge flag indicates to use the motion vector predictor index, wherein the blocks in the decoded image are blocks at the same positions as the blocks to be decoded or blocks neighboring the blocks at the same positions, and the decoded image is temporally different from an image including the blocks to be decoded, wherein a motion vector of the blocks in the decoded image is set to the motion vector of any one block in a predetermined region per predetermined region; and wherein the predetermined threshold size is set to be smaller than a size of the predetermined region.

3. A non-transitory recording medium storing a moving picture decoding program with motion compensating prediction in units of block, the moving picture decoding program causing a computer to perform:

a motion vector predictor candidate generating step of, when a block size of blocks to be decoded is larger than a predetermined threshold size, including a motion vector predictor candidate derived from blocks in a decoded image into a motion vector predictor candidate list, and when the block size of the blocks to be decoded is smaller than or equal to the predetermined threshold size, not including the motion vector predictor candidate into the motion vector predictor candidate list;

a motion information candidate generating step of, when the block size of blocks to be decoded is larger than the predetermined threshold size, including a motion information candidate derived from blocks in the decoded image into a motion information candidate list, and when the block size of the blocks to be decoded is smaller than or equal to the predetermined threshold size, not including the motion information candidate into the motion information candidate list;

a decoding step of decoding a merge flag indicating using a merge index or a motion vector predictor index, wherein the decoding step, when the merge flag indicates to use the merge index, decodes the merge index on a position of motion information to be referred to in the motion information candidate list, and when the merge flag indicates to use the motion vector predictor index, decodes the motion vector predictor index on a position of motion vector predictor to be referred to in the motion vector predictor candidate list;

a motion information selecting step of selecting motion information of the blocks to be decoded from the motion information candidate list based on information on the position of the motion information to be referred to in the motion information candidate list when the merge flag indicates to use the merge index; and a motion vector predictor selecting step of selecting a motion vector predictor of the blocks to be decoded from the motion vector predictor candidate list based on information on the position of the motion vector predictor to be referred to in the motion vector predictor candidate list when the merge flag indicates to use the motion vector predictor index, wherein the blocks in the decoded image are blocks at the same positions as the blocks to be decoded or blocks neighboring the blocks at the same positions, and the decoded image is temporally different from an image including the blocks to be decoded, wherein a motion vector of the blocks in the decoded image is set to the motion vector of any one block in a predetermined region per predetermined region; and wherein the predetermined threshold size is set to be smaller than a size of the predetermined region.

* * * * *